(12) United States Patent
Huang-Fu et al.

(10) Patent No.: US 11,696,170 B2
(45) Date of Patent: Jul. 4, 2023

(54) METHOD AND APPARATUS FOR SINGLE NETWORK SLICE SELECTION ASSISTANCE INFORMATION BASED CONGESTION CONTROL IN MOBILE COMMUNICATIONS

(71) Applicant: MediaTek Inc., Hsinchu (TW)

(72) Inventors: Chien-Chun Huang-Fu, Hsinchu (TW); Chi-Hsien Chen, Hsinchu (TW); Po-Kuang Lu, Hsinchu (TW); Yu-Chieh Tien, Hsinchu (TW)

(73) Assignee: MediaTek Inc.

( * ) Notice: Subject to any disclaimer, the term of this patent is extended or adjusted under 35 U.S.C. 154(b) by 75 days.

(21) Appl. No.: 16/937,393

(22) Filed: Jul. 23, 2020

(65) Prior Publication Data

US 2021/0051515 A1 Feb. 18, 2021

Related U.S. Application Data

(60) Provisional application No. 62/907,918, filed on Sep. 30, 2019, provisional application No. 62/888,145, filed on Aug. 16, 2019.

(51) Int. Cl.
*H04W 28/00* (2009.01)
*H04W 28/02* (2009.01)
*H04W 36/14* (2009.01)
*H04W 84/04* (2009.01)

(52) U.S. Cl.
CPC ....... *H04W 28/0289* (2013.01); *H04W 36/14* (2013.01); *H04W 84/042* (2013.01)

(58) Field of Classification Search
CPC ..... H04W 12/06; H04W 88/06; H04W 28/08; H04W 76/27; H04W 76/10
See application file for complete search history.

(56) References Cited

U.S. PATENT DOCUMENTS

| 2018/0352483 | A1 | 12/2018 | Youn et al. |
| 2020/0396648 | A1* | 12/2020 | Watfa ............... H04W 36/0027 |
| 2020/0404734 | A1* | 12/2020 | Watfa ............... H04W 48/16 |

(Continued)

FOREIGN PATENT DOCUMENTS

| CN | 108684073 A | 10/2018 |
| CN | 109257769 A | 1/2019 |

(Continued)

OTHER PUBLICATIONS

ETSI (ETSI TS 124 501 V15.3.0 (May 2019)).*

(Continued)

*Primary Examiner* — Abdelillah Elmejjarmi
(74) *Attorney, Agent, or Firm* — Han IP PLLC; Andy M. Han

(57) ABSTRACT

Various solutions for single network slice selection assistance information (S-NSSAI) based congestion control with respect to user equipment and network apparatus in mobile communications are described. An apparatus may receive a message with a back-off timer from the network node. The apparatus may determine whether an S-NSSAI of a protocol data unit (PDU) session is provided by the network node. The apparatus may start the back-off timer and associate the back-off timer with the S-NSSAI of the PDU session in an event that the S-NSSAI is provided by the network node.

13 Claims, 16 Drawing Sheets

(56) References Cited

U.S. PATENT DOCUMENTS

2021/0029628 A1\* 1/2021 Kim .................. H04W 76/19
2021/0360723 A1\* 11/2021 Takakura ............. H04W 76/18

FOREIGN PATENT DOCUMENTS

| CN | 109803347 A | 5/2019 |
|---|---|---|
| WO | WO 2019135560 A1 | 7/2019 |
| WO | WO 2019135581 A1 | 7/2019 |

OTHER PUBLICATIONS

Eurpean Patent Office, European Search Report and Written Opinion for European Patent Application No. 20190443.0, dated Jan. 13, 2021.

Intel et al., Clarification on NAS level congestion control, 3GPP TSG-SA WG2 Meeting #131, S2-1902804, Santa Cruz-Tenerife, Spain, Feb. 25-Mar. 1, 2019.

LG Electronics, Clarifying S-NSSAI based congestion control upon PLMN change, 3GPP TSG-CT WG1 Meeting #117, C1-193553, Reno, USA, May 13-17, 2019.

ZTE et al., Correctin on the 5GSM S-NSSAI congestion control, 3GPP TSG-CT WG1 Meeting #116, C1-192790, Xi'an, China, Apr. 8-12, 2019.

China National Intellectual Property Administration, First Office Action regarding China Patent Application No. 202010819203.9, dated Jun. 22, 2022.

3rd Generation Partnership Project (3GPP), Technical Specification 24.501 V15.1.0.

\* cited by examiner

METHOD AND APPARATUS FOR SINGLE NETWORK SLICE SELECTION ASSISTANCE INFORMATION BASED CONGESTION CONTROL IN MOBILE COMMUNICATIONS

CROSS REFERENCE TO RELATED PATENT APPLICATION(S)

The present disclosure claims the priority benefit of U.S. Provisional Patent Application No. 62/888,145, filed on 16 Aug. 2019, and U.S. Provisional Patent Application No. 62/907,918, filed 30 Sep. 2019. The contents of aforementioned applications are herein incorporated by reference in their entirety.

TECHNICAL FIELD

The present disclosure is generally related to mobile communications and, more particularly, to single network slice selection assistance information (S-NSSAI) based congestion control enhancement with respect to user equipment and network apparatus in mobile communications.

BACKGROUND

Unless otherwise indicated herein, approaches described in this section are not prior art to the claims listed below and are not admitted as prior art by inclusion in this section.

$5^{th}$ generation system (5GS) networks are packet-switched (PS) Internet Protocol (IP) networks. This means that the networks deliver all data traffic in IP packets, and provide users with always-on IP connectivity. When the UE joins a 5GS network, a packet data network (PDN) address (i.e., the one that can be used on the PDN) is assigned to the UE for its connection to the PDN. In 4G, EPS has defined a default EPS bearer to provide the IP connectivity that is always-on. In 5G, a protocol data unit (PDU) session establishment procedure is a parallel procedure of a PDN connection procedure in 4G. A PDU session defines the association between the UE and the data network that provides a PDU connectivity service. Each PDU session is identified by a PDU session ID, and may include multiple quality of service (QoS) flows and QoS rules.

The 5GS supports network slicing as described in $3^{rd}$ Generation Partnership Project (3GPP) Technical Specification (TS) 23.501. A network slice may be viewed as a logical end-to-end network that can be dynamically created and can provide specific network capabilities and network characteristics. A given UE may access to multiple slices over the same Access Network (e.g. over the same radio interface). Each slice may serve a particular service type. A network slice is defined within a public land mobile network (PLMN) and includes the core network control plane and user plane network functions as well as the 5G access network (AN). Within a PLMN or stand-alone non-public networks (SNPN), a network slice is identified by an S-NSSAI, which is comprised of a slice/service type (SST) and a slice differentiator (SD). Inclusion of an SD in an S-NSSAI may be optional. A set of one or more S-NSSAIs is called the NSSAI. The S-NSSAI may be signaled by the UE to the network to assist the network in selecting a particular network slice instance.

It was agreed that the S-NSSAI value of a PDU session can be updated, (e.g., when the UE moves to a different PLMN), thus the S-NSSAI of a serving PLMN associated with a PDU session may be changed during the PDU session lifetime (e.g., after inter-PLMN change). Therefore, regarding S-NSSAI based congestion control, it seems to be not appropriate to always associate the S-NSSAI based back-off timer with the S-NSSAI provided by the UE during the PDU session establishment. If the S-NSSAI based back-off timer does not be associated to an appropriate S-NSSAI value when inter-PLMN change occurs, the congestion control mechanism could be executed incorrectly. Therefore, the S-NSSAI-based congestion control mechanism may need update accordingly.

Accordingly, how to design and enhance the S-NSSAI-based congestion control mechanism becomes an important issue in the newly developed wireless communication network. Therefore, there is a need to provide proper schemes to associate the S-NSSAI based back-off timer with an appropriate S-NSSAI.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to S-NSSAI based congestion control enhancement with respect to user equipment and network apparatus in mobile communications.

In one aspect, a method may involve an apparatus receiving a message with a back-off timer from a network node. The method may also involve the apparatus determining whether an S-NSSAI of a PDU session is provided by the network node. Then, the method may involve the apparatus starting the back-off timer and associating the back-off timer with the S-NSSAI of the PDU session in an event that the S-NSSAI is provided by the network node.

In one aspect, a method may involve an apparatus receiving a message with a back-off timer from a network node. The method may also involve the apparatus starting the back-off timer associated with an S-NSSAI of a PDU session. The method may further determining whether an S-NSSAI of a request message is the S-NSSAI associated with the back-off timer involve the apparatus. Then, the method may involve the apparatus forbidding a transmission of the request message in an event that the S-NSSAI of the request message is the S-NSSAI associated with the back-off timer.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising receiving, via the transceiver, a message with a back-off timer from a network node. The processor may also perform operations comprising determining whether an S-NSSAI of a PDU session is provided by the network node. The processor may further perform operations comprising starting the back-off timer and associating the back-off timer with the S-NSSAI of the PDU session in an event that the S-NSSAI is provided by the network node.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising receiving, via the transceiver, a message with a back-off timer from a network node. The processor may also perform operations comprising starting the back-off timer associated with an S-NSSAI of a PDU session. The processor may further perform operations comprising determining whether an S-NSSAI of a request message is the S-NSSAI associated with the back-off timer involve the apparatus. The processor may further perform operations comprising forbidding a transmission of the request message in an event that the S-NSSAI of the request message is the S-NSSAI associated with the back-off timer.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to S-NSSAI based congestion control with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
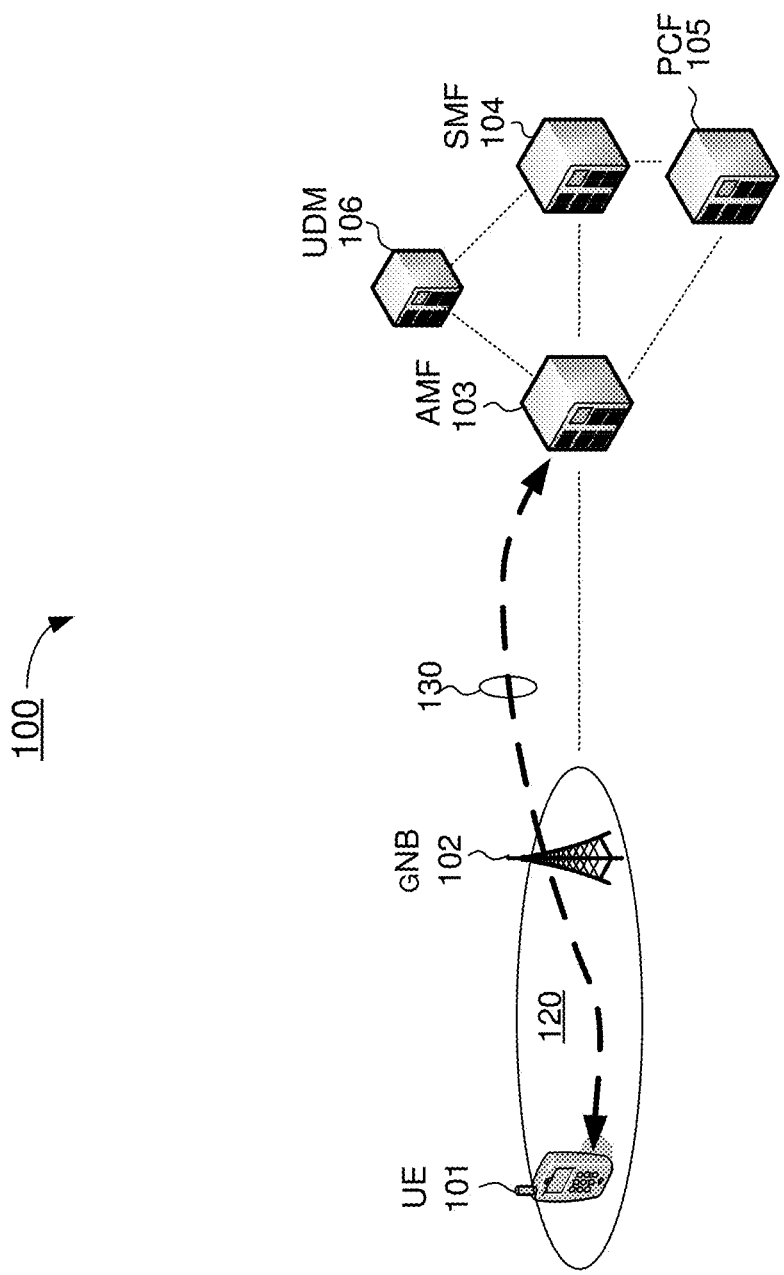
FIG. 1 is a diagram depicting an exemplary 5G network in accordance with implementations of the present disclosure.

FIG. 1 illustrates an exemplary 5G network 100 in accordance with implementations of the present disclosure. 5G NR network 100 may comprise a UE 101, a base station gNB 102, an access and mobility management function (AMF) 103, a session management function (SMF) 104, a policy control function (PCF) 105, and a unified data management (UDM) 106. In the example of FIG. 1, UE 101 and its serving base station gNB 102 belong to part of a radio access network (RAN) 120. In the access stratum (AS) layer, RAN 120 may provide radio access for UE 101 via a radio access technology (RAT). In non-access stratum (NAS) layer, AMF 103 may communicate with gNB 102, SMF 104, PCF 105 and UDM 106 for access and mobility management of wireless access devices in 5G network 100. UE 101 may be equipped with a radio frequency (RF) transceiver or multiple RF transceivers for different application services via different RATs/core networks (CNs). UE 101 may be implemented as a smart phone, a wearable device, an Internet of Things (IoT) device, a tablet, a vehicle, etc.

The 5GS supports network slicing as described in 3GPP TS 23.501. A network slice may be viewed as a logical end-to-end network that can be dynamically created and can provide specific network capabilities and network characteristics. A given UE may access to multiple slices over the same Access Network (e.g. over the same radio interface). Each slice may serve a particular service type. A network slice is defined within a PLMN and includes the core network control plane and user plane network functions as well as the 5G AN. Within a PLMN or SNPN, a network slice is identified by an S-NSSAI, which is comprised of an SST and an SD. Inclusion of an SD in an S-NSSAI may be optional. A set of one or more S-NSSAIs is called the NSSAI. The S-NSSAI may be signaled by the UE to the network to assist the network in selecting a particular network slice instance.

Figure 2:
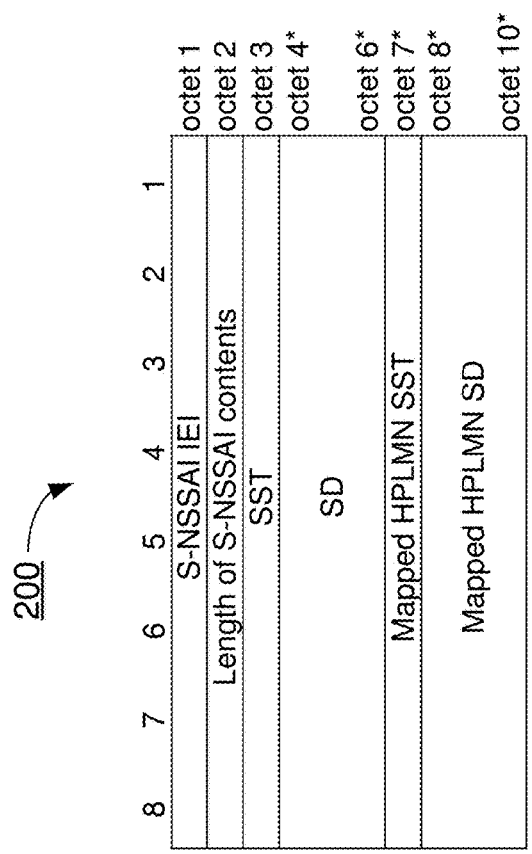
FIG. 2 is tables illustrating the content of S-NSSAI information element and SST values as defined in 3GPP specification.

The purpose of the S-NSSAI information element is to identify a network slice. FIG. 2 illustrates the content of S-NSSAI information element and SST values as defined in 3GPP specification. The S-NSSAI information element may comprise the SST and the SD. The SST may refer to the expected network slice behavior in terms of features and services. The SD may be an optional information that complements the slice/service type(s) to differentiate amongst multiple network slices of the same slice/service type. The SST may define a plurality of different service types. As shown in FIG. 2, SST value "1" may correspond to a slice suitable for the handling of 5G enhanced mobile broadband (eMBB). SST value "2" may correspond to a slice suitable for the handling of ultra-reliable low latency communications (URLLC). SST value "3" may correspond to a slice suitable for the handling of massive IoT (MIoT). SST value "4" may correspond to a slice suitable for the handling of vehicle to everything (V2X) services.

It was agreed that the S-NSSAI value of a PDU session can be updated, (e.g., when the UE moves to a different PLMN), thus the S-NSSAI of a serving PLMN associated with a PDU session may be changed during the PDU session lifetime (e.g., after inter-PLMN change). Therefore, regarding S-NSSAI based congestion control, it seems to be not appropriate to always associate the S-NSSAI based back-off timer with the S-NSSAI provided by the UE during the PDU session establishment. If the S-NSSAI based back-off timer does not be associated to an appropriate S-NSSAI value when inter-PLMN change occurs, the congestion control mechanism could be executed incorrectly. For example, the UE may not be able to forbid 5GSM procedure to the congested network slices. The UE may incorrectly forbid the 5GSM procedure targeting to a not congested network slice. Therefore, the S-NSSAI-based congestion control mechanism may need update accordingly, i.e., to associate the back-off timer with the updated S-NSSAI value instead of always with the S-NSSAI value provided by the UE when establishing the PDU session.

In view of the above, the present disclosure proposes a number of schemes pertaining to S-NSSAI based congestion control enhancement with respect to the UE and the network apparatus. According to the schemes of the present disclosure, after establishing a PDU session, the UE may properly update the S-NSSAI when the UE moves to a different PLMN (e.g., inter-PLMN change). The UE may be able to apply the updated/latest S-NSSAI of the PDU session to the back-off timer for the S-NSSAI based congestion control. On the other hand, it is also not clear what is the S-NSSAI value associated with the back-off timer in an event that the back-off timer is applied in all PLMNs. The present disclosure also defines the UE handling in roaming and non-roaming scenarios when the back-off timer is applied in all PLMNs. Accordingly, the UE may be able to apply the back-off timer for the S-NSSAI based congestion control correctly and appropriately.

Specifically, to establish a PDU session in a PLMN, the UE may be configured to transmit a PDU session establishment request message to the network node. The UE may provide a valid S-NSSAI value in the PDU session establishment request procedure. Then, the UE may receive a PDU session establishment accept message from the network node. The network node may provide an S-NSSAI value requested by the UE in the PDU session establishment accept message. The PDU session may be successfully established with the S-NSSAI value requested by the UE. After the PDU session is established, the UE may move to a different PLMN (e.g., inter-PLMN change). For example, the UE may transfer from a first PLMN to a second PLMN. At this time, the S-NSSAI of the PDU session may also be changed from a first S-NSSAI to a second S-NSSAI. The PDU session now may be associated to the second S-NSSAI. The UE may receive the second S-NSSAI associated with the second PLMN from the network node.

Alternatively, in the PDU session establishment request procedure, the UE may transmit a PDU session establishment request message with no S-NSSAI to the network node. Then, the UE may receive a PDU session establishment accept message from the network node. The network node may select and provide an S-NSSAI value to the UE in the PDU session establishment accept message. The PDU session may be successfully established with the S-NSSAI value provided by the network node. Similarly, after the PDU session is established, the UE may move to a different PLMN (e.g., inter-PLMN change). For example, the UE may transfer from a first PLMN to a second PLMN. At this time, the S-NSSAI of the PDU session may also be changed from a first S-NSSAI to a second S-NSSAI. The PDU session now may be associated to the second S-NSSAI. The UE may receive the second S-NSSAI associated with the second PLMN from the network node.

The UE may be configured to transmit a request message to the network node. The request message may comprise at least one of a PDU session establishment request, a PDU session modification request, and a PDU session release request. In an event that the network node is in the congestion status, the UE may receive a message with a congestion cause and a back-off timer for congestion control from the network node. The message may comprise at least one of a PDU session establishment reject, a PDU session modification reject, and a PDU session release command. After receiving the message, the UE may be configured to start the back-off timer. The UE may associate the back-off timer with the S-NSSAI in an event that the S-NSSAI is provided by the network node. The S-NSSAI is the updated/latest S-NSSAI of the current PDU session provided by the network node.

In some implementation, in the PDU session establishment procedure, after transmitting the PDU session establishment request message, the UE may receive a message with a congestion cause and a back-off timer from the network node in an event that the network node is in the congestion status. Since the UE only has the S-NSSAI requested by the UE, the UE may be configured to associate the back-off timer with the S-NSSAI requested by the UE (e.g., a requested S-NSSAI or no S-NSSAI) in an event that no S-NSSAI is provided by the network node. The back-off timer may comprise at least one of a congestion back-off timer T3584 and a congestion back-off timer T3585.

Figure 3:
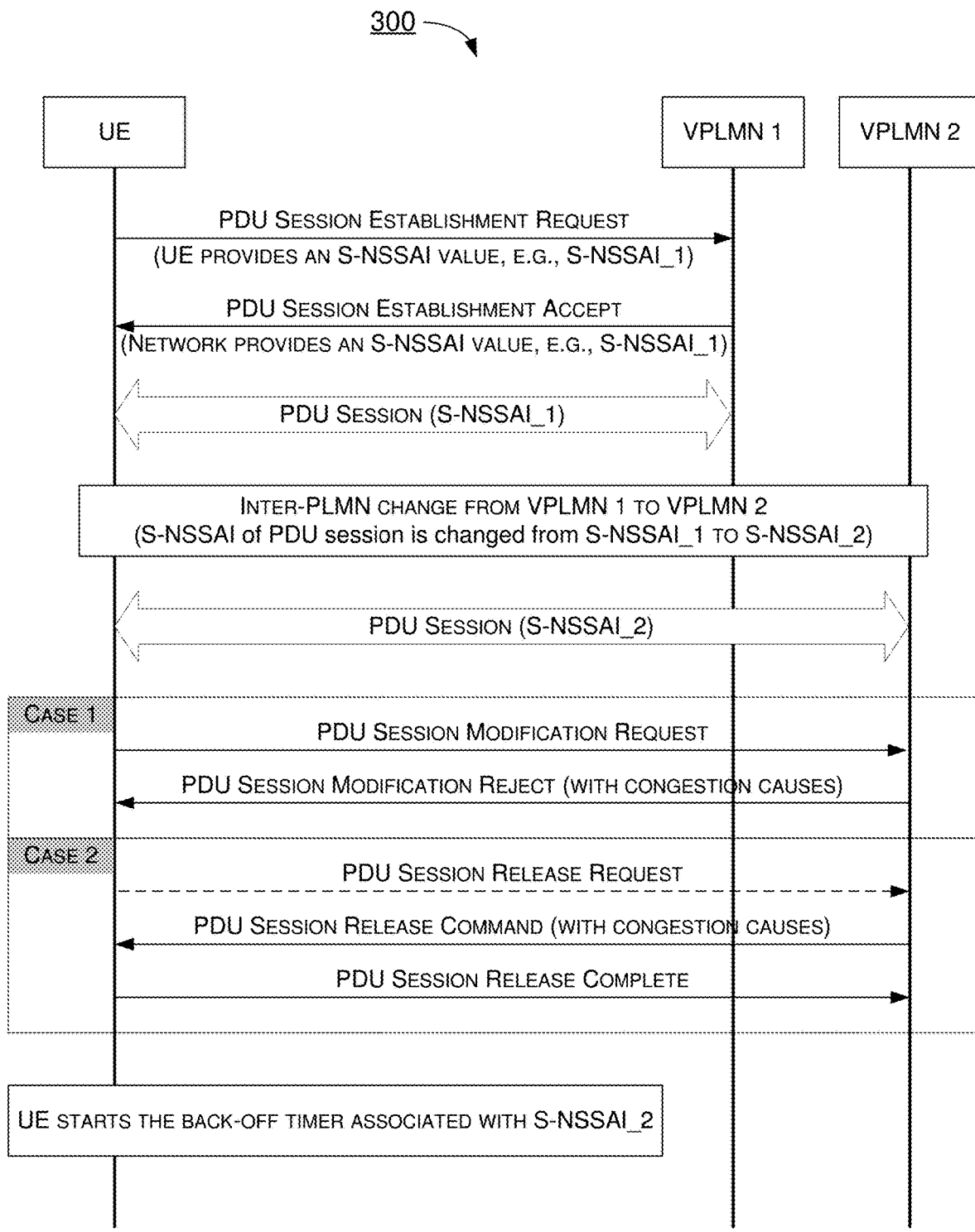
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a plurality network nodes, which may be a part of a wireless communication network (e.g., an LTE network, an LTE-Advanced network, a 5G/NR network, an IoT network, or a V2X network). Scenario 300 illustrates which S-NSSAI value the UE should associate with the back-off timer in an event that the UE provides a valid S-NSSAI when establishing the PDU session. At first, the UE may register in a first PLMN (e.g., visited PLMN (VPLMN) 1). The UE may be configured to transmit a PDU session establishment request message to VPLMN 1. The UE may provide a valid S-NSSAI value (e.g., S-NSSAI_1) to VPLMN 1. Then, VPLMN 1 may transmit a PDU session establishment accept message to the UE. VPLMN 1 may provide the requested S-NSSAI value (e.g., S-NSSAI_1) to the UE. Thus, the PDU session may be established between the UE and VPLMN 1 with S-NSSAI_1.

The UE may transfer from the first PLMN to a second PLMN (e.g., inter-PLMN change from VPLMN 1 to VPLMN 2). The S-NSSAI of the PDU session may be changed from S-NSSAI_1 to S-NSSAI_2. At this moment, the PDU session may be maintained between the UE and VPLMN 2 with S-NSSAI_2. When in the VPLMN 2, the UE may be configured to perform a PDU session modification/release procedure with VPLMN 2. For example, as shown in case 1, the UE may transmit a PDU session modification request message to VPLM 2. In an event that the network node (e.g., SMF) in VPLMN 2 is in the congestion status, VPLMN 2 may transmit a PDU session modification reject message with a congestion cause. The congestion cause may comprise, for example and without limitation, 5GSM cause value #67 "insufficient resources for specific slice and DNN" or 5GSM cause value #69 "insufficient resources for specific slice". After receiving the congestion cause, the UE may be configured to start a back-off timer. The back-off timer may comprise the congestion back-off timer T3584 or the congestion back-off timer T3585. The UE may associate the back-off timer with the updated/latest S-NSSAI (e.g., S-NSSAI_2).

In another example, as shown in case 2, the UE may optionally transmit a PDU session release request message to VPLM 2. In an event that the network node (e.g., SMF) in VPLMN 2 is in the congestion status, VPLMN 2 may transmit a PDU session release command message with a congestion cause to the UE. Alternatively, the VPLMN may directly transmit the PDU session release command message to the UE without receiving the PDU session release request from the UE. Then, the UE may transmit a PDU session release complete message to VPLM 2. Similarly, after receiving the congestion cause, the UE may be configured to start a back-off timer. The back-off timer may comprise the congestion back-off timer T3584 or the congestion back-off timer T3585. The UE may associate the back-off timer with the updated/latest S-NSSAI (e.g., S-NSSAI_2).

Figure 4:
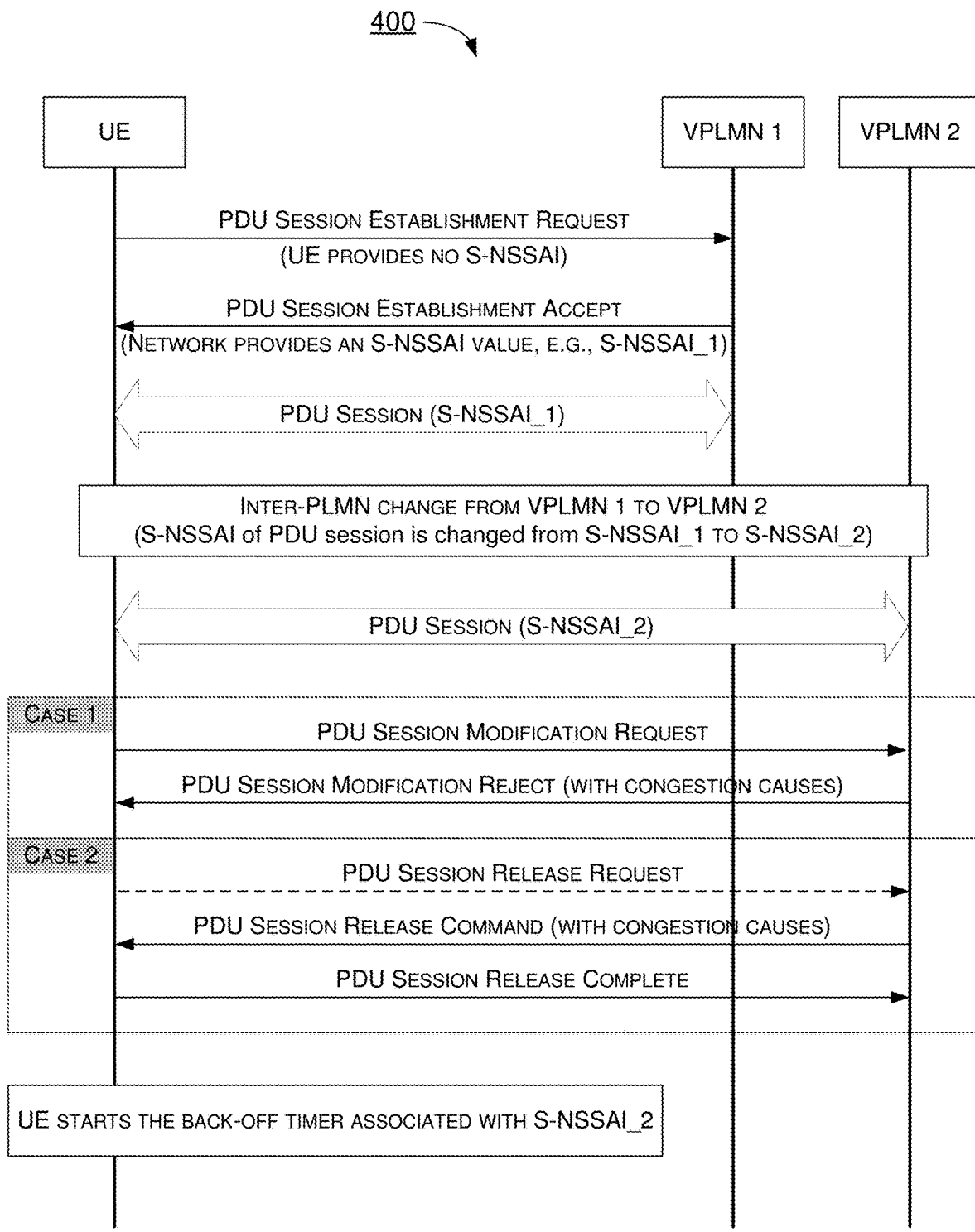
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE and a plurality network nodes, which may be a part of a wireless communication network (e.g., an LTE network, an LTE-Advanced network, a 5G/NR network, an IoT network, or a V2X network). Scenario 400 illustrates which S-NSSAI value the UE should associate with the back-off timer in an event that the UE provides no S-NSSAI when establishing the PDU session. At first, the UE may register in a first PLMN (e.g., VPLMN 1). The UE may be configured to transmit a PDU session establishment request message to VPLMN 1. The UE may provide no S-NSSAI to VPLMN 1 (e.g., the UE does not provide any S-NSSAI value). Then, VPLMN 1 may transmit a PDU session establishment accept message to the UE. VPLMN 1 may select and provide an S-NSSAI value (e.g., S-NSSAI_1) to the UE. Thus, the PDU session may be established between the UE and VPLMN 1 with S-NSSAI_1.

The UE may transfer from the first PLMN to a second PLMN (e.g., inter-PLMN change from VPLMN 1 to VPLMN 2). The S-NSSAI of the PDU session may be changed from S-NSSAI_1 to S-NSSAI_2. At this moment, the PDU session may be maintained between the UE and VPLMN 2 with S-NSSAI_2. When in the VPLMN 2, the UE may be configured to perform a PDU session modification/release procedure with VPLMN 2. For example, as shown in case 1, the UE may transmit a PDU session modification request message to VPLM 2. In an event that the network node (e.g., SMF) in VPLMN 2 is in the congestion status, VPLMN 2 may transmit a PDU session modification reject message with a congestion cause. The congestion cause may comprise, for example and without limitation, 5GSM cause value #67 "insufficient resources for specific slice and DNN" or 5GSM cause value #69 "insufficient resources for specific slice". After receiving the congestion cause, the UE may be configured to start a back-off timer. The back-off timer may comprise the congestion back-off timer T3584 or the congestion back-off timer T3585. The UE may associate the back-off timer with the updated/latest S-NSSAI (e.g., S-NSSAI_2).

In another example, as shown in case 2, the UE may optionally transmit a PDU session release request message to VPLM 2. In an event that the network node (e.g., SMF) in VPLMN 2 is in the congestion status, VPLMN 2 may transmit a PDU session release command message with a congestion cause to the UE. Alternatively, the VPLMN may directly transmit the PDU session release command message to the UE without receiving the PDU session release request from the UE. Then, the UE may transmit a PDU session release complete message to VPLM 2. Similarly, after receiving the congestion cause, the UE may be configured to start a back-off timer. The back-off timer may comprise the congestion back-off timer T3584 or the congestion back-off timer T3585. The UE may associate the back-off timer with the updated/latest S-NSSAI (e.g., S-NSSAI_2). It should be noted that, without the enhancement in accordance with implementations of the present disclosure, the UE will start the back-off timer associated with no S-NSSAI since no S-NSSAI is provided by the UE during the PDU session establishment procedure. Such legacy handling could cause incorrect congestion control mechanism since the back-off timer is not associated with a proper S-NSSAI.

Figure 5:
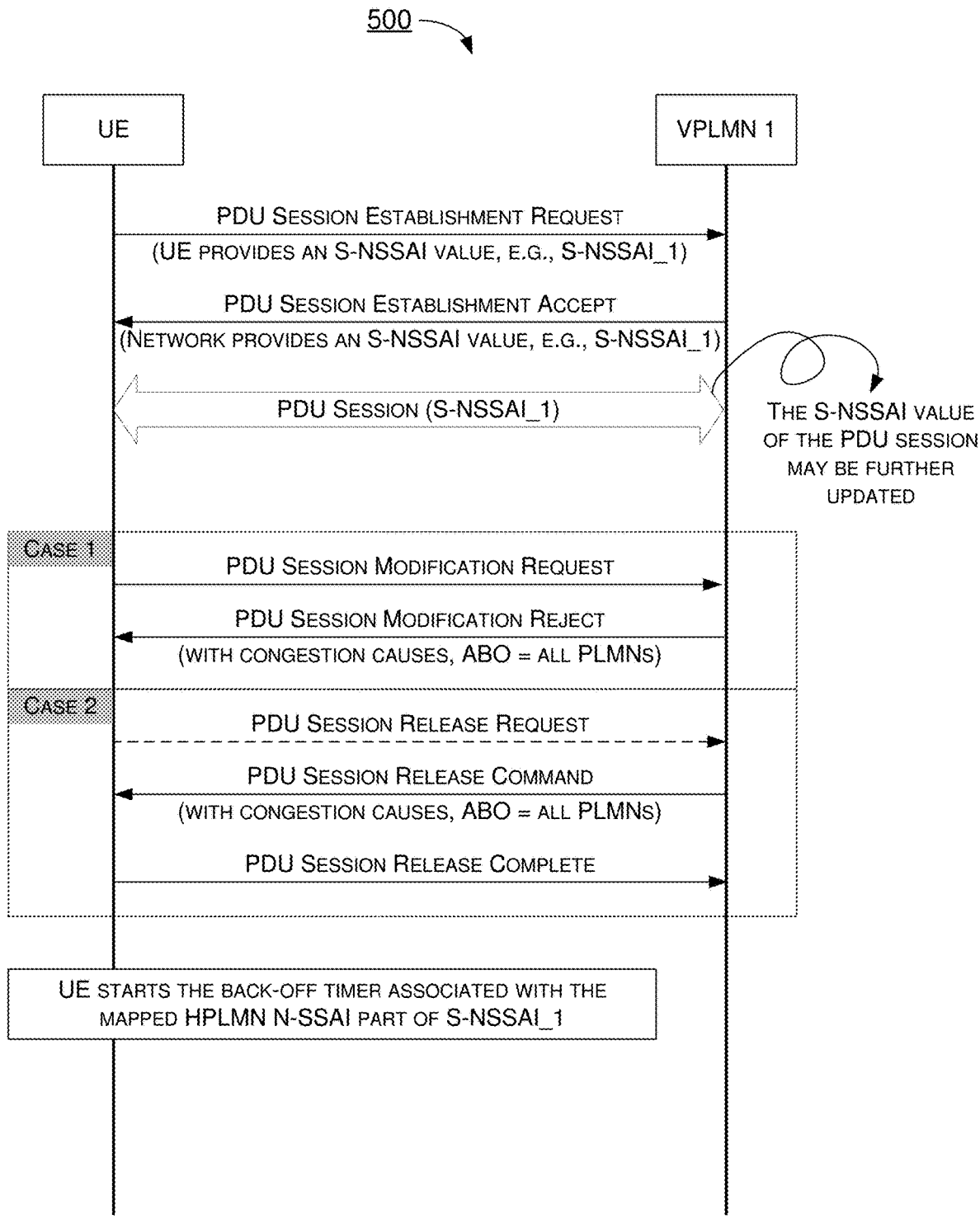
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves a UE and a plurality network nodes, which may be a part of a wireless communication network (e.g., an LTE network, an LTE-Advanced network, a 5G/NR network, an IoT network, or a V2X network). Scenario 500 illustrates which S-NSSAI value the UE should associate with the back-off timer in an event that the back-off timer is applied in all PLMNs. As mentioned above, an S-NSSAI may comprise the SST and the SD. In the S-NSSAI information element, as shown in FIG. 2, the first SST/SD set is called "serving PLMN S-NSSAI" and the second SST/SD set is called "mapped home PLMN (HPLMN) S-NSSAI". When the UE is in non-roaming condition (i.e., attached in HPLMN), the network (i.e., HPLMN) shall only provide the serving PLMN S-NSSAI part (i.e., the HPLMN S-NSSAI) but no mapped HPLMN S-NSSAI part. When the UE is in roaming condition (i.e., attached in VPLMN), the network (i.e., VPLMN) shall provide both the serving PLMN S-NSSAI part (i.e., the serving VPLMN S-NSSAI) and the mapped HPLMN S-NSSAI part. Therefore, since the S-NSSAI information element may comprise the serving PLMN S-NSSAI part and the mapped HPLMN S-NSSAI part in roaming scenario, which S-NSSAI part the UE should associate with the back-off timer should be further defined when the back-off timer is applied in all PLMNs.

Specifically, the UE may be configured to transmit a request message to the network node. The request message may comprise at least one of a PDU session establishment request, a PDU session modification request, and a PDU session release request. In an event that the network node is in the congestion status, the UE may receive a message with a congestion cause and a back-off timer for congestion control from the network node. The message may comprise at least one of a PDU session establishment reject, a PDU session modification reject, and a PDU session release command. After receiving the message, the UE may be configured to start the back-off timer. The UE may associate the back-off timer with a mapped HPLMN S-NSSAI in an event that the back-off timer is applied in all PLMN. The UE may determine whether the back-off timer is applied in all PLMN according to an apply back-off timer (ABO) parameter/indicator.

As shown in FIG. 5, the UE may be configured to transmit a PDU session establishment request message to VPLMN 1. The UE may provide a valid S-NSSAI value (e.g., S-NSSAI_1) to VPLMN 1. Then, VPLMN 1 may transmit a PDU session establishment accept message to the UE. VPLMN 1 may provide the requested S-NSSAI value (e.g., S-NSSAI_1) to the UE. Thus, the PDU session may be established between the UE and VPLMN 1 with S-NSSAI_1.

The UE may transmit a PDU session modification request message to VPLM 1. In an event that the network node (e.g., SMF) in VPLMN 1 is in the congestion status, VPLMN 1 may transmit a PDU session modification reject message with a congestion cause to the UE. The congestion cause may comprise, for example and without limitation, 5GSM cause value #67 "insufficient resources for specific slice and DNN" or 5GSM cause value #69 "insufficient resources for specific slice". VPLMN 1 may further provide the ABO parameter/indicator to indicate that the back-off timer is applied in all PLMNs. After receiving the congestion cause and "ABO=applied in all PLMNs", the UE may be configured to start a back-off timer. The back-off timer may comprise the congestion back-off timer T3584 or the congestion back-off timer T3585. The UE may associate the back-off timer with the mapped HPLMN S-NSSAI part of S-NSSAI_1.

Figure 6:
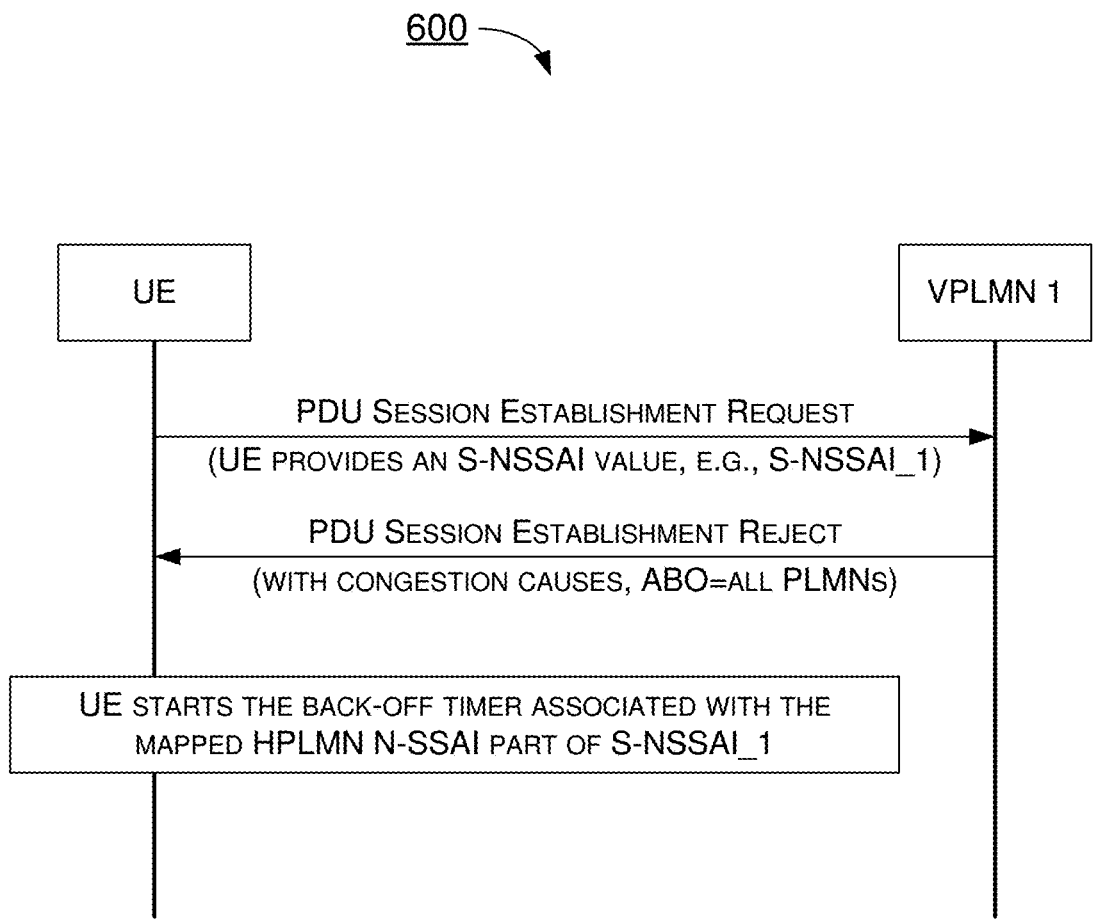
FIG. 6 is a diagram depicting an example scenario under schemes in accordance with implementations of the present disclosure.

FIG. 6 illustrates an example scenario 600 under schemes in accordance with implementations of the present disclosure. Scenario 600 involves a UE and a plurality network nodes, which may be a part of a wireless communication network (e.g., an LTE network, an LTE-Advanced network, a 5G/NR network, an IoT network, or a V2X network). Scenario 600 illustrates which S-NSSAI value the UE should associate with the back-off timer during the PDU session establishment procedure in an event that the back-off timer is applied in all PLMNs. The UE may be configured to transmit a PDU session establishment request message to VPLMN 1. The UE may provide a valid S-NSSAI value (e.g., S-NSSAI_1) to VPLMN 1. In an event that the network node (e.g., SMF) in VPLMN 1 is in the congestion status, VPLMN 1 may transmit a PDU session establishment reject message with a congestion cause to the UE. The congestion cause may comprise, for example and without limitation, 5GSM cause value #67 "insufficient resources for specific slice and DNN" or 5GSM cause value #69 "insufficient resources for specific slice". VPLMN 1 may further provide the ABO parameter/indicator to indicate that the back-off timer is applied in all PLMNs. After receiving the congestion cause and "ABO=applied in all PLMNs", the UE may be configured to start a back-off timer. The back-off timer may comprise the congestion back-off timer T3584 or the congestion back-off timer T3585. The UE may associate the back-off timer with the mapped HPLMN S-NSSAI part of S-NSSAI_1.

In accordance with implementations of the present disclosure, it is clearly defined that when the back-off timer is indicated to apply in all PLMNs, it means that the congestion status occurs only in the HPLMN. Therefore, the UE should associate the back-off timer only with the mapped HPLMN S-NSSAI part and should not associate the back-off timer with the serving PLMN S-NSSAI part. In an event that the congestion status occurs in the VPLMN, the ABO indicator should be indicated as "the back-off timer is applied in the registered PLMN". Then, the UE should associate the back-off timer with the serving PLMN S-NSSAI part.

In some implementations, the UE may provide no S-NSSAI to the network during the PDU session establishment procedure. For example, the UE may transmit a PDU session establishment request message with no S-NSSAI to VPLMN 1. In an event that the network node (e.g., SMF) in VPLMN 1 is in the congestion status, VPLMN 1 may transmit a reject message with a congestion cause. VPLMN 1 may further provide the parameter/indicator ABO to indicate that the back-off timer is applied in all PLMNs. In an event that the ABO indicator is indicated as "the back-off timer is applied in the registered PLMN" and no S-NSSAI is provided by the network node, the UE may associate the back-off timer with no S-NSSAI. In an event that the ABO indicator is indicated as "the back-off timer is applied in all PLMNs" and no S-NSSAI is provided by the network node, the UE may associate the back-off timer with no S-NSSAI.

In some abnormal cases, the UE may be provided with mapped HPLMN S-NSSAI when the UE is in non-roaming condition. (i.e., attached in HPLMN). In such cases, the UE may register in the HPLMN. The UE may determine whether the mapped HPLMN S-NSSAI is received from the network node. In an event that the mapped HPLMN S-NSSAI is received from the network node, the UE may be configured to associate the back-off timer with the mapped HPLMN S-NSSAI or no S-NSSAI after receiving the congestion cause and the ABO indicator is indicated as "the back-off timer is applied in all PLMNs".

In summary, when the ABO is indicated as "the back-off timer is applied in all PLMNs", in the PDU session establishment procedure, in an event that the mapped HPLMN S-NSSAI is provided (e.g., both in roaming and non-roaming scenarios), then the UE may associate the back-off timer with the mapped HPLMN S-NSSAI only. In an event that the HPLMN S-NSSAI is provided without the mapped HPLMN S-NSSAI (e.g., in non-roaming scenario), then the UE may associate the back-off timer with the HPLMN S-NSSAI. In an event that no-SNSSAI is provided, then the UE may associate the back-off timer with no S-NSSAI. In the PDU session modification/release procedure, in an event that the mapped HPLMN S-NSSAI is associated with the PDU session, then the UE may associate the back-off timer with the mapped HPLMN S-NSSAI only. In an event that the HPLMN (e.g., without the mapped HPLMN S-NSSAI) is associated with the PDU session, then the UE may associate the back-off timer with the HPLMN S-NSSAI. In an event that no-SNSSAI is provided, then the UE may associate the back-off timer with no S-NSSAI. When the ABO is indicated as "the back-off timer is applied in the registered PLMN", in the PDU establishment procedure, the UE may associate the back-off timer with the serving PLMN S-NSSAI only, or both the serving PLMN S-NSSAI and the mapped HPLMN S-NSSAI. In an event that no-SNSSAI is provided, then the UE may associate the back-off timer with no S-NSSAI. In the PDU session modification/release procedure, the UE may associate the back-off timer with the serving PLMN S-NSSAI associated with the PDU session only, or both the serving PLMN S-NSSAI and the mapped HPLMN S-NSSAI associated with the PDU session. The back-off timer may comprise at least one of a congestion back-off timer T3584 and a congestion back-off timer T3585.

Figure 7A:
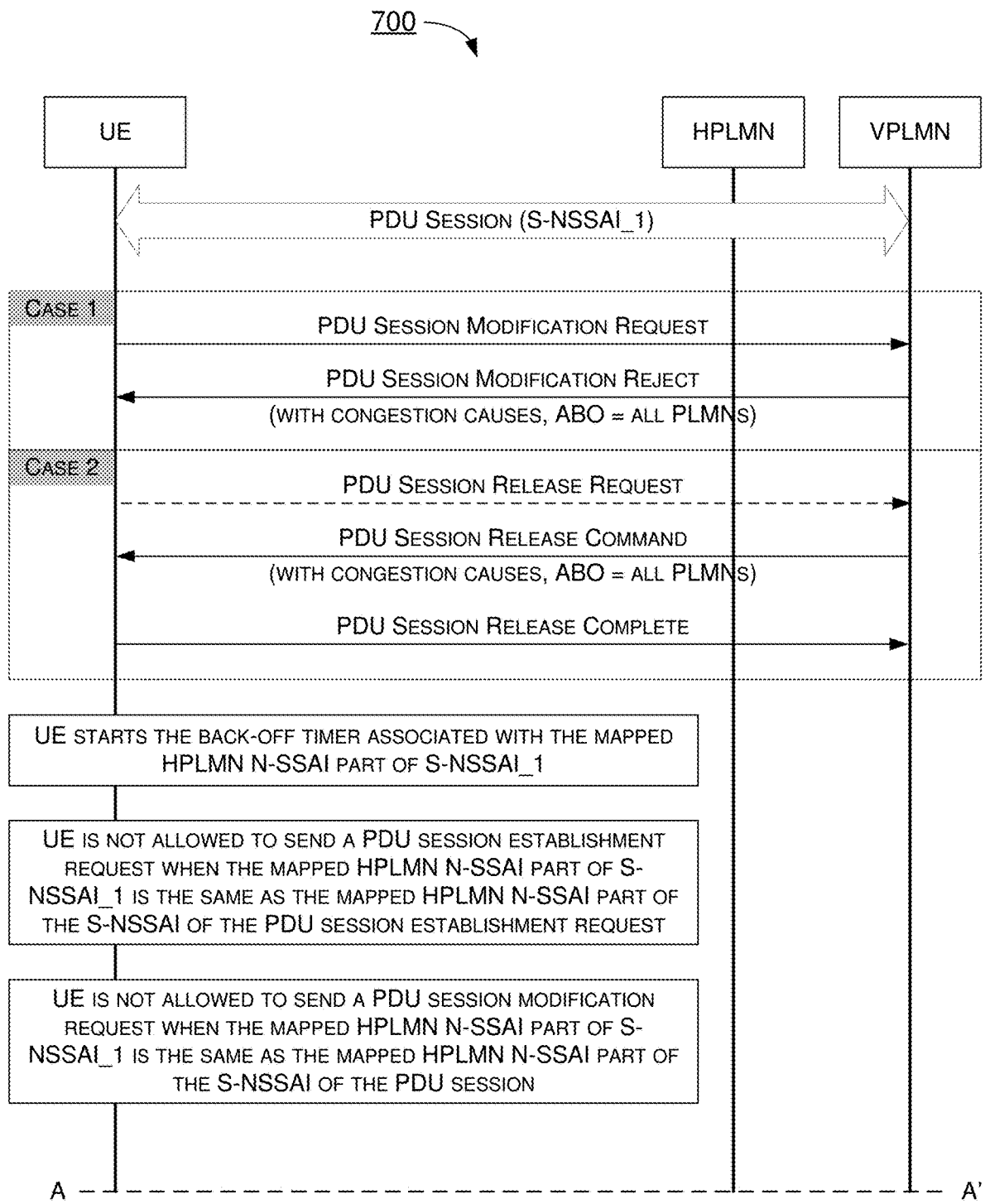
FIGS. 7A-7B are diagrams depicting an example scenario under schemes in accordance with implementations of the present disclosure.
Figure 7B:
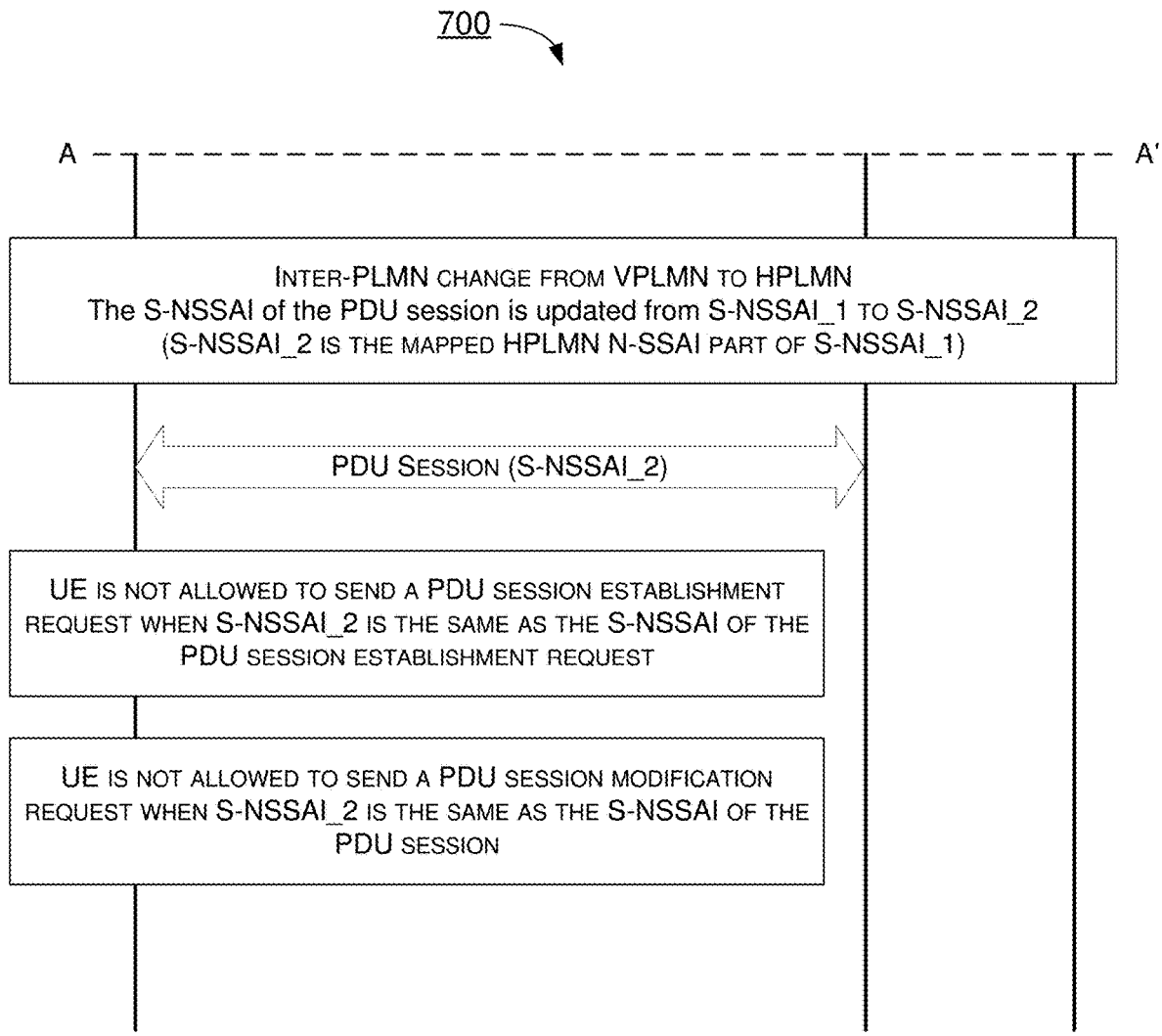
Figure 7B:
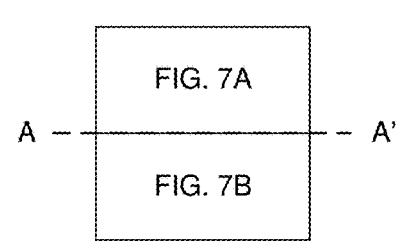

FIGS. 7A-7B illustrate an example scenario 700 under schemes in accordance with implementations of the present disclosure. Scenario 700 involves a UE and a plurality network nodes, which may be a part of a wireless communication network (e.g., an LTE network, an LTE-Advanced network, a 5G/NR network, an IoT network, or a V2X network). Scenario 700 illustrates which procedures should be applied with the back-off timer when the back-off timer is running and applied in all PLMNs. Specifically, the UE may receive a message with a back-off timer from the network node. The UE may be configured to start the back-off timer associated with an S-NSSAI of a PDU session. Then, the UE may determine whether an S-NSSAI of a request message is the S-NSSAI associated with the back-off timer. In an event that the S-NSSAI of the request message is the S-NSSAI associated with the back-off timer, the UE may forbid a transmission of the request message (e.g., the UE is not allowed to transmit the request message). The request message may comprise at least one of a PDU session establishment request and a PDU session modification request. When the ABO parameter/indicator is indicated as "ABO=applied in all PLMNs" in non-roaming scenario or "ABO=RPLMN", the S-NSSAI of the request is the S-NSSAI associated with the PDU session establishment request message or the S-NSSAI of the PDU session associated with the PDU session modification request message. When the ABO parameter/indicator is indicated as "ABO=applied in all PLMNs" in roaming scenario, the S-NSSAI of the request is the mapped HPLMN S-NSSAI associated with the PDU session establishment request message or the mapped HPLMN S-NSSAI of the PDU session associated with the PDU session modification request message.

As shown in FIGS. 7A-7B, the UE may register in a VPLMN (e.g., roaming scenario) and establish a PDU session with an S-NSSAI (e.g., S-NSSAI_1). The UE may transmit a request message to modify or release the PDU session. For example, as shown in case 1, the UE may transmit a PDU session modification request message to the VPLMN. In an event that the network node (e.g., SMF) in the VPLMN is in the congestion status, the VPLMN may transmit a PDU session modification reject message with a congestion cause to the UE. In another example, as shown in case 2, the UE may optionally transmit a PDU session release request message to the VPLM. In an event that the network node (e.g., SMF) in the VPLMN is in the congestion status, the VPLMN may transmit a PDU session release command message with a congestion cause to the UE. Alternatively, the VPLMN may directly transmit the PDU session release command message to the UE without receiving the PDU session release request from the UE. Then, the UE may transmit a PDU session release complete message to the VPLMN. The congestion cause may comprise, for example and without limitation, 5GSM cause value #67 "insufficient resources for specific slice and DNN" or 5GSM cause value #69 "insufficient resources for specific slice". The VPLMN may further provide the ABO parameter/indicator to indicate that the back-off timer is applied in all PLMNs. After receiving the congestion cause and "ABO=applied in all PLMNs", the UE may be configured to start a back-off timer. The back-off timer may comprise the congestion back-off timer T3584 or the congestion back-off timer T3585. The UE may associate the back-off timer with the mapped HPLMN S-NSSAI part of S-NSSAI_1.

When the back-off timer is running, the UE is under congestion control and forbidden to send a request message that the associated S-NSSAI is identical to the S-NSSAI associated with the back-off timer. The UE may be configured to compare the S-NSSAI associated with the back-off timer with the S-NSSAI associated with the request message. For example, the UE is not allowed to send a PDU session establishment request when the mapped HPLMN S-NSSAI part of S-NSSAI_1 associated with the back-off timer is the same as the mapped HPLMN S-NSSAI part of the S-NSSAI of the PDU session establishment request. In another example, the UE is not allowed to send a PDU session modification request when the mapped HPLMN S-NSSAI part of S-NSSAI_1 associated with the back-off timer is the same as the mapped HPLMN S-NSSAI part of the S-NSSAI of the PDU session (e.g., the current/latest PDU session).

When the back-off timer is running, the UE may move to a different PLMN (e.g., inter-PLMN change). For example, the UE may transfer from the VPLMN to the HPLMN (e.g., non-roaming scenario). At this time, the S-NSSAI of the PDU session may also be updated from S-NSSAI_1 to S-NSSAI_2 where S-NSSAI_2 is the mapped HPLMN S-NSSAI part of S-NSSAI_1. The PDU session now may be associated to S-NSSAI_2. S-NSSAI_2 may be the serving PLMN S-NSSAI or the mapped HPLMN S-NSSAI provided by the network node. The UE may apply the back-off timer to S-NSSAI_2 since the back-off timer is applied in all PLMNs. Since the UE is still under congestion control and the S-NSSAI of the current/latest PDU session is changed, the UE is forbidden to send a request message that the associated S-NSSAI of the current/latest PDU session is identical to the S-NSSAI associated with the back-off timer. The UE may be configured to compare the S-NSSAI associated with the back-off timer with the S-NSSAI associated with the request message of the current/latest PDU session. For example, the UE is not allowed to send a PDU session establishment request when S-NSSAI_2 associated with the back-off timer is the same as the S-NSSAI (e.g., serving PLMN S-NSSAI or mapped HPLMN S-NSSAI) of the PDU session establishment request. In another example, the UE is not allowed to send a PDU session modification request when S-NSSAI_2 associated with the back-off timer is the same as the S-NSSAI (e.g., serving PLMN S-NSSAI or mapped HPLMN S-NSSAI) of the PDU session (e.g., the current/latest PDU session).

In another example, when the back-off timer is running, the UE may transfer from a first VPLMN (e.g., VPLMN_1) to a second VPLMN (e.g., VPLMN_2) during the inter-PLMN change (e.g., still in roaming scenario). At this time, the S-NSSAI of the PDU session may also be updated from a first S-NSSAI (e.g., S-NSSAI_1) to a second S-NSSAI (e.g., S-NSSAI_2). The PDU session now may be associated to S-NSSAI_2. The UE may now apply the back-off timer to the mapped HPLMN S-NSSAI of S-NSSAI_2 since the back-off timer is applied in all PLMNs. Since the UE is still under congestion control and the S-NSSAI of the current/latest PDU session is changed, the UE is forbidden to send a request message that the associated mapped HPLMN S-NSSAI of the current/latest PDU session (e.g., mapped HPLMN S-NSSAI of S-NSSAI_2) is identical to the S-NSSAI associated with the back-off timer. The UE may be configured to compare the S-NSSAI associated with the back-off timer with the mapped HPLMN S-NSSAI associated with the request message of the current/latest PDU session. For example, the UE is not allowed to send a PDU session establishment request when the S-NSSAI associated with the back-off timer is the same as the mapped HPLMN S-NSSAI part of the PDU session establishment request. In another example, the UE is not allowed to send a PDU session modification request when the S-NSSAI associated with the back-off timer is the same as the mapped HPLMN S-NSSAI part of the PDU session (e.g., the current/latest PDU session).

Figure 8A:
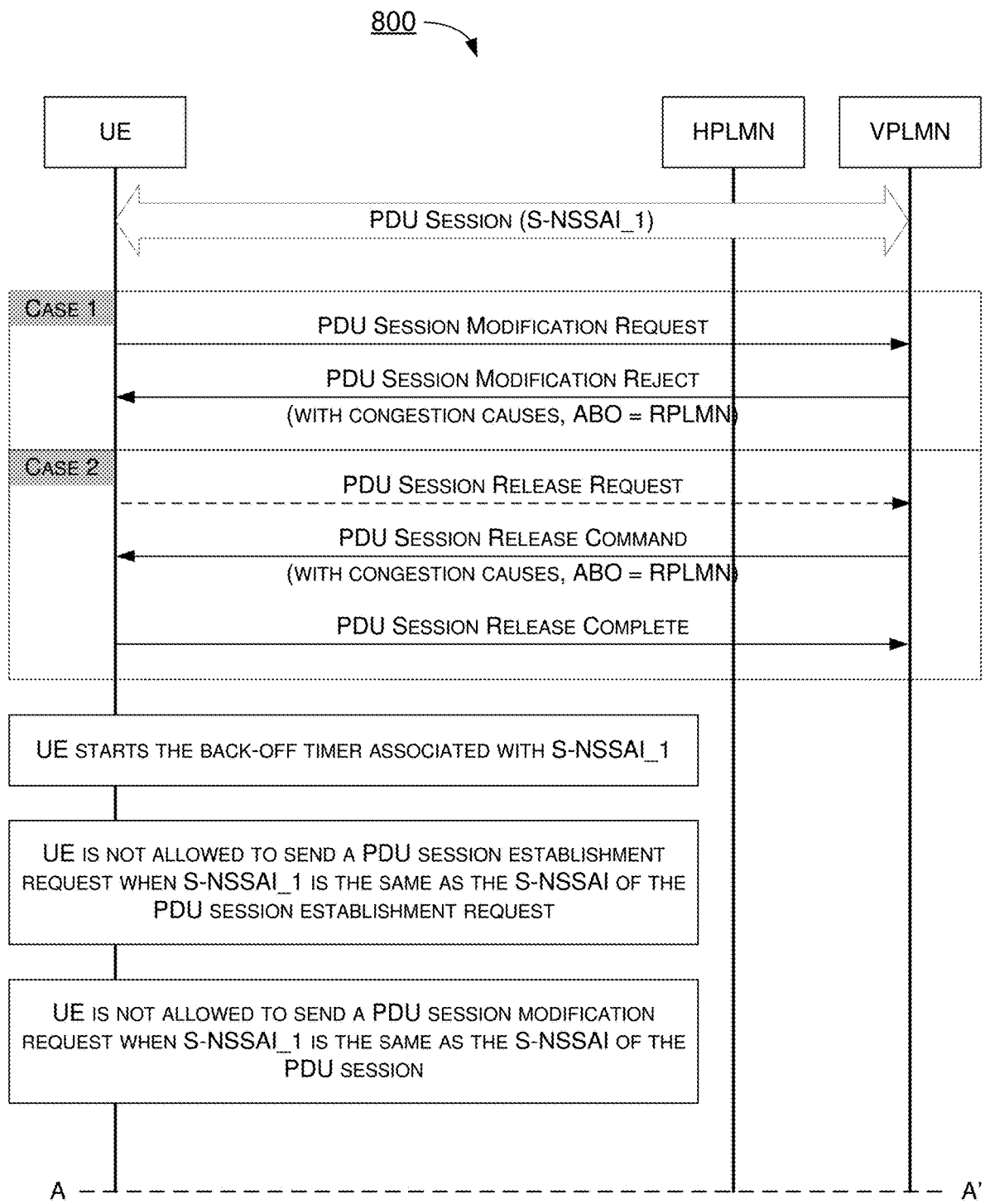
FIGS. 8A-8B are diagrams depicting an example scenario under schemes in accordance with implementations of the present disclosure.
Figure 8B:
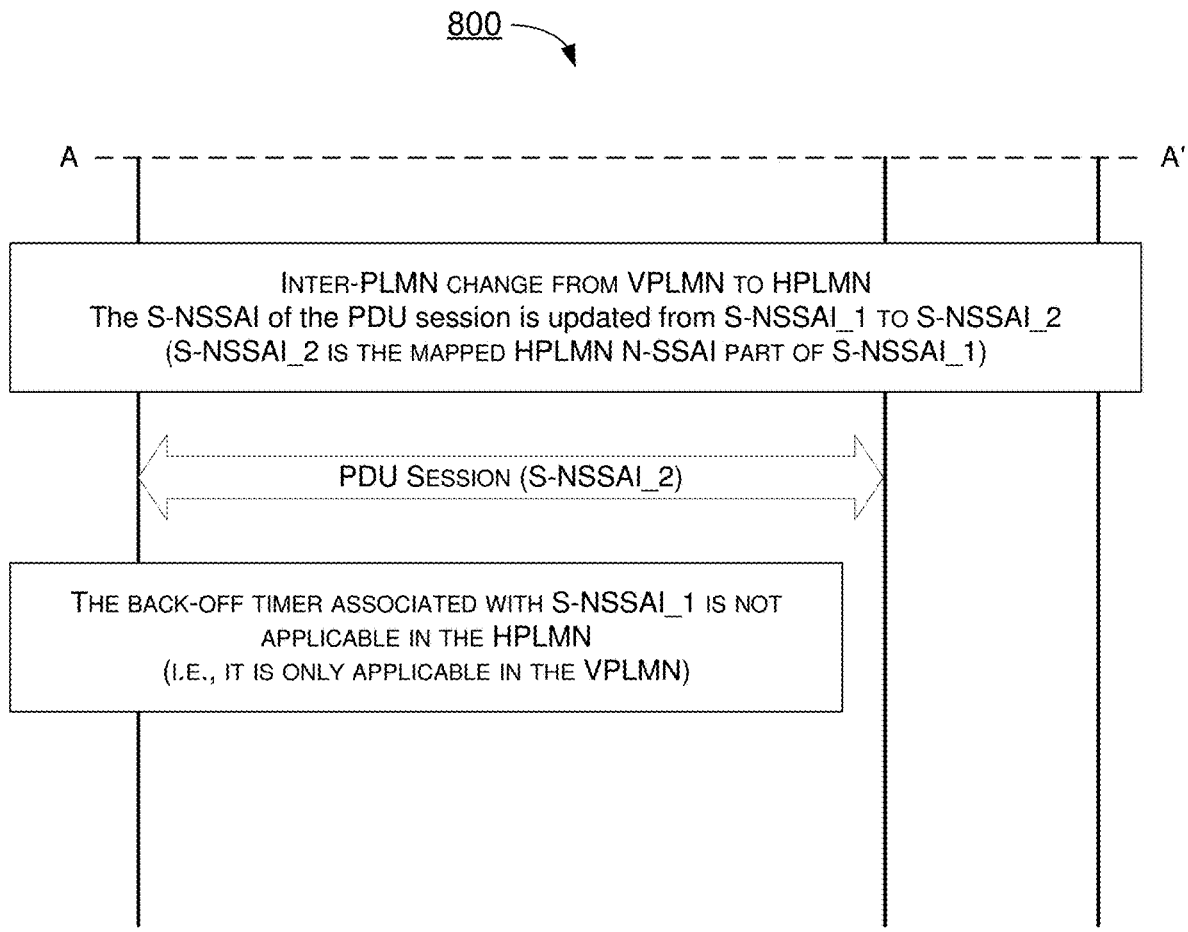
Figure 8B:
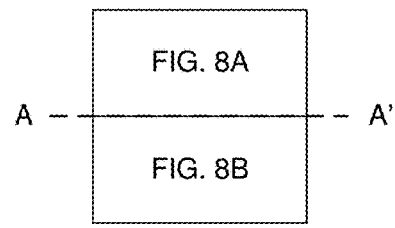

FIGS. 8A-8B illustrate an example scenario 800 under schemes in accordance with implementations of the present disclosure. Scenario 800 involves a UE and a plurality network nodes, which may be a part of a wireless communication network (e.g., an LTE network, an LTE-Advanced network, a 5G/NR network, an IoT network, or a V2X network). Scenario 800 illustrates which procedures should be applied with the back-off timer when the back-off timer is running and applied in the RPLMN. As shown in FIGS. 8A-8B, the UE may register in a VPLMN (e.g., roaming scenario) and establish a PDU session with an S-NSSAI (e.g., S-NSSAI_1). The UE may transmit a request message to modify or release the PDU session. For example, as shown in case 1, the UE may transmit a PDU session modification request message to the VPLMN. In an event that the network node (e.g., SMF) in the VPLMN is in the congestion status, the VPLMN may transmit a PDU session modification reject message with a congestion cause to the UE. In another example, as shown in case 2, the UE may optionally transmit a PDU session release request message to the VPLM. In an event that the network node (e.g., SMF) in the VPLMN is in the congestion status, the VPLMN may transmit a PDU session release command message with a congestion cause to the UE. Alternatively, the VPLMN may directly transmit the PDU session release command message to the UE without receiving the PDU session release request from the UE. Then, the UE may transmit a PDU session release complete message to the VPLMN. The congestion cause may comprise, for example and without limitation, 5GSM cause value #67 "insufficient resources for specific slice and DNN" or 5GSM cause value #69 "insufficient resources for specific slice". The VPLMN may further provide the ABO parameter/indicator to indicate that the back-off timer is applied in the RPLMN. After receiving the congestion cause and "ABO=applied in the RPLMN", the UE may be configured to start a back-off timer. The back-off timer may comprise the congestion back-off timer T3584 or the congestion back-off timer T3585. The UE may associate the back-off timer with S-NSSAI_1.

When the back-off timer is running, the UE is under congestion control and forbidden to send a request message that the associated S-NSSAI is identical to the S-NSSAI associated with the back-off timer. The UE may be configured to compare the S-NSSAI associated with the back-off timer with the S-NSSAI associated with the request message. For example, the UE is not allowed to send a PDU session establishment request when S-NSSAI_1 associated with the back-off timer is the same as the S-NSSAI of the PDU session establishment request. In another example, the UE is not allowed to send a PDU session modification request when S-NSSAI_1 associated with the back-off timer is the same as the S-NSSAI of the PDU session (e.g., the current/latest PDU session).

When the back-off timer is running, the UE may move to a different PLMN (e.g., inter-PLMN change). For example, the UE may transfer from the VPLMN to the HPLMN (e.g., non-roaming scenario). At this time, the S-NSSAI of the PDU session may also be updated from S-NSSAI_1 to S-NSSAI_2 where S-NSSAI_2 is the mapped HPLMN S-NSSAI part of S-NSSAI_1. The PDU session now may be associated to S-NSSAI_2. S-NSSAI_2 may be the serving PLMN S-NSSAI or the mapped HPLMN S-NSSAI provided by the network node. The UE may be configured not to apply the back-off timer to S-NSSAI_2 (i.e., HPLMN) since the back-off timer is only applicable in the VPLMN (i.e., ABO=ABO=applied in the RPLMN). The back-off timer associated with S-NSSAI_1 is not applicable in the HPLMN. The UE is allowed to send a request message that the associated S-NSSAI of the current/latest PDU session is not identical to the S-NSSAI associated with the back-off timer. The UE may be configured to compare the S-NSSAI associated with the back-off timer with the S-NSSAI associated with the request message of the current/latest PDU session. For example, the UE is able to send a PDU session establishment request since S-NSSAI_1 associated with the back-off timer is not the same as the S-NSSAI (e.g., serving PLMN S-NSSAI or mapped HPLMN S-NSSAI) of the PDU session establishment request. In another example, the UE is able to send a PDU session modification request since S-NSSAI_1 associated with the back-off timer is not the same as the S-NSSAI (e.g., serving PLMN S-NSSAI or mapped HPLMN S-NSSAI) of the PDU session (e.g., the current/latest PDU session).

In summary, in the PDU session establishment or modification procedure, when the ABO is indicated as "the back-off timer is applied in all PLMNs" and the UE is in the roaming scenario, the UE is forbidden to send a request message in an event that the mapped HPLMN S-NSSAI of the request message is the same as the mapped HPLMN S-NSSAI associated with the back-off timer. When the ABO is indicated as "the back-off timer is applied in all PLMNs" and the UE is in the non-roaming scenario, the UE is forbidden to send a request message in an event that the mapped HPLMN S-NSSAI or serving PLMN S-NSSAI of the request message is the same as the mapped HPLMN S-NSSAI associated with the back-off timer. When the ABO is indicated as "the back-off timer is applied the RPLMN", the UE is forbidden to send a request message in an event that the S-NSSAI or the serving PLMN S-NSSAI of the request message is the same as the S-NSSAI associated with the back-off timer. The back-off timer is not applicable in an event that the UE performs inter-PLMN change from the VPLMN to HPLMN.

Accordingly, when a back-off is configured, the UE can use the S-NSSAI of the current/latest PDU session rather than the S-NSSAI of the old PDU session to compare with the S-NSSAI associated with the back-off timer to determine whether it is forbidden to send the request message. Thus, the UE can apply the back-off timer to the appropriate procedures and can fulfill the congestion control initiated by the network node.

Figure 9:
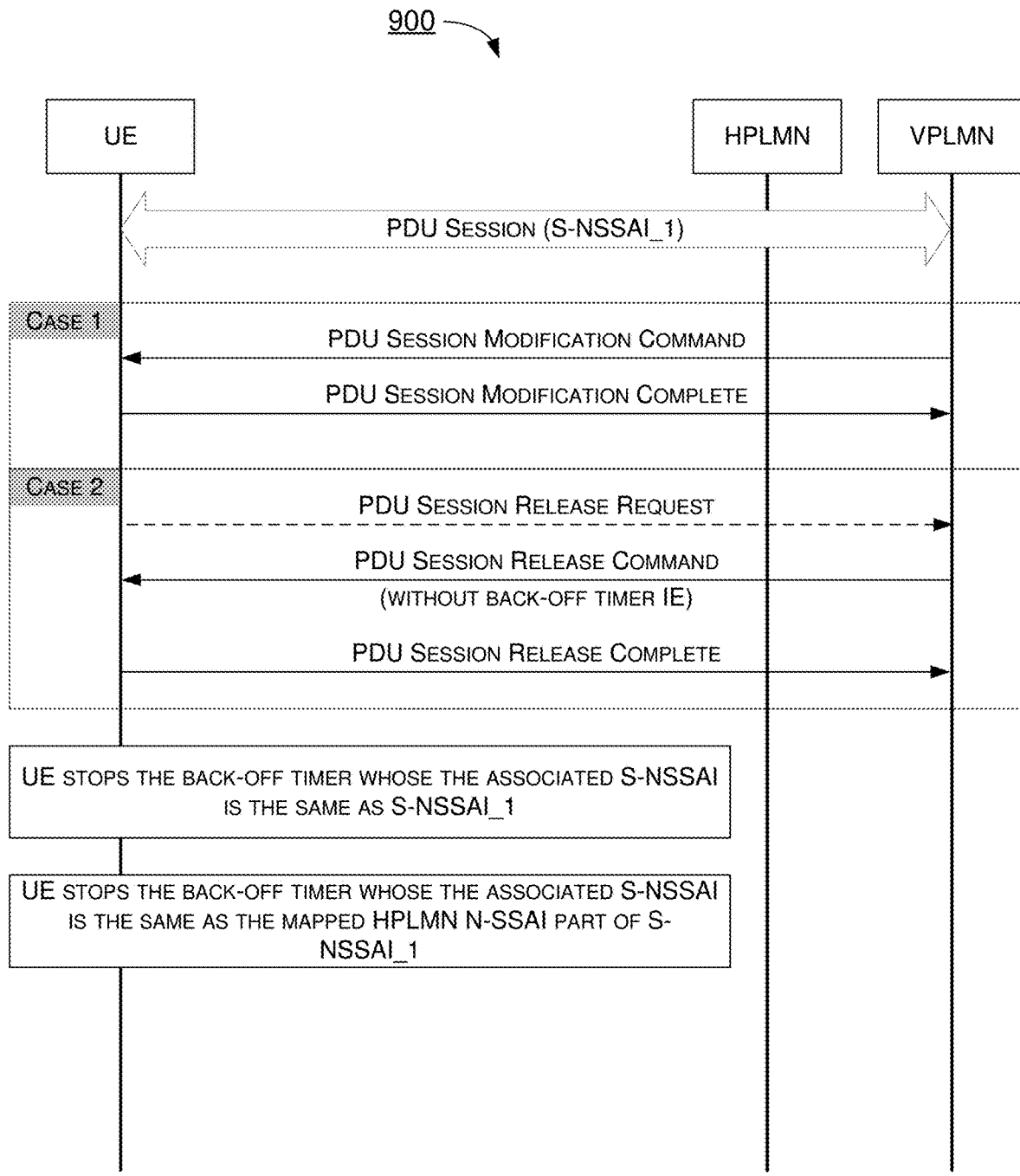
FIG. 9 is a diagram depicting an example scenario under schemes in accordance with implementations of the present disclosure.

FIG. 9 illustrates an example scenario 900 under schemes in accordance with implementations of the present disclosure. Scenario 900 involves a UE and a plurality network nodes, which may be a part of a wireless communication network (e.g., an LTE network, an LTE-Advanced network, a 5G/NR network, an IoT network, or a V2X network). Scenario 900 illustrates how to stop the back-off timer when the back-off timer is running. Specifically, the UE may receive a message with a back-off timer from the network node. The UE may be configured to start the back-off timer associated with an S-NSSAI of a PDU session. When the back-off timer is running, the UE may further receive a 5GSM message from the network node. Then, the UE may determine whether an S-NSSAI of PDU session of the 5GSM message is the S-NSSAI associated with the back-off timer. In an event that the S-NSSAI of PDU session of the 5GSM message is the S-NSSAI associated with the back-off timer, the UE may be configured to stop the back-off timer. The 5GSM message may comprise at least one of a PDU session modification command and a PDU session release command without a back-off timer value information element.

As shown in FIG. 9, the UE may register in a VPLMN (e.g., roaming scenario) and establish a PDU session with an S-NSSAI (e.g., S-NSSAI_1). When the back-off timer is running, the UE may further receive a 5GSM message from the network node. For example, as shown in case 1, the UE may receive a PDU session modification command message from the VPLMN. Then, the UE may transmit a PDU session modification complete message to the VPLMN. In another example, as shown in case 2, the UE may optionally transmit a PDU session release request message to the VPLM. The VPLMN may transmit a PDU session release command message without the back-off timer information element to the UE. Alternatively, the VPLMN may directly transmit the PDU session release command message to the UE without receiving the PDU session release request from the UE. Then, the UE may transmit a PDU session release complete message to the VPLMN.

The VPLMN may further provide the ABO parameter/ indicator to indicate that the back-off timer is applied in all PLMNs. After receiving the congestion cause and "ABO=applied in all PLMNs", the UE may be configured to start a back-off timer. The back-off timer may comprise the congestion back-off timer T3584 or the congestion back-off timer T3585. The UE may associate the back-off timer with the mapped HPLMN S-NSSAI part of S-NSSAI_1. In case of a roaming scenario, after receiving the 5GSM message, the UE may be configured to determine whether a mapped HPLMN S-NSSAI of PDU session of the 5GSM message is the same as the mapped HPLMN S-NSSAI part of S-NSSAI_1 associated with the back-off timer. In an event that the result is yes, the UE may be configured to stop the back-off timer. In case of a non-roaming scenario, the UE may be configured to determine whether a mapped HPLMN S-NSSAI or serving PLMN S-NSSAI of PDU session of the 5GSM message is the same as the mapped HPLMN S-NS-SAI part of S-NSSAI_1 associated with the back-off timer. In an event that the result is yes, the UE may be configured to stop the back-off timer.

Alternatively, after receiving the congestion cause and "ABO=applied in the RPLMN", the UE may be configured to start a back-off timer. The back-off timer may comprise the congestion back-off timer T3584 or the congestion back-off timer T3585. The UE may associate the back-off timer with S-NSSAI_1. After receiving the 5GSM message, the UE may be configured to determine whether the serving PLMN S-NSSAI of PDU session of the 5GSM message is the same as S-NSSAI_1 associated with the back-off timer. In an event that the result is yes, the UE may be configured to stop the back-off timer.

In summary, after receiving the PDU session modification command or the PDU session release command without a back-off timer value information element, when the ABO is indicated as "the back-off timer is applied in all PLMNs" and the UE is in the roaming scenario, the UE may stop the back-off timer in an event that the mapped HPLMN S-NS-SAI of PDU session of the 5GSM message is the same as the mapped HPLMN S-NSSAI associated with the back-off timer. When the ABO is indicated as "the back-off timer is applied in all PLMNs" and the UE is in the non-roaming scenario, the UE may stop the back-off timer in an event that the mapped HPLMN S-NSSAI or serving PLMN S-NSSAI of PDU session of the 5GSM message is the same as the mapped HPLMN S-NSSAI associated with the back-off timer. When the ABO is indicated as "the back-off timer is applied the RPLMN", the UE may stop the back-off timer in an event that the S-NSSAI or the serving PLMN S-NSSAI of PDU session of the 5GSM message is the same as the S-NSSAI associated with the back-off timer.

Accordingly, when a back-off is running, the UE can use the S-NSSAI of PDU session of the 5GSM message rather than the S-NSSAI of the old PDU session to compare with the S-NSSAI associated with the back-off timer to determine whether it can stop the back-off timer. Thus, the UE can stop the back-off timer appropriately while fulfilling the congestion control initiated by the network node.

Illustrative Implementations

Figure 10:
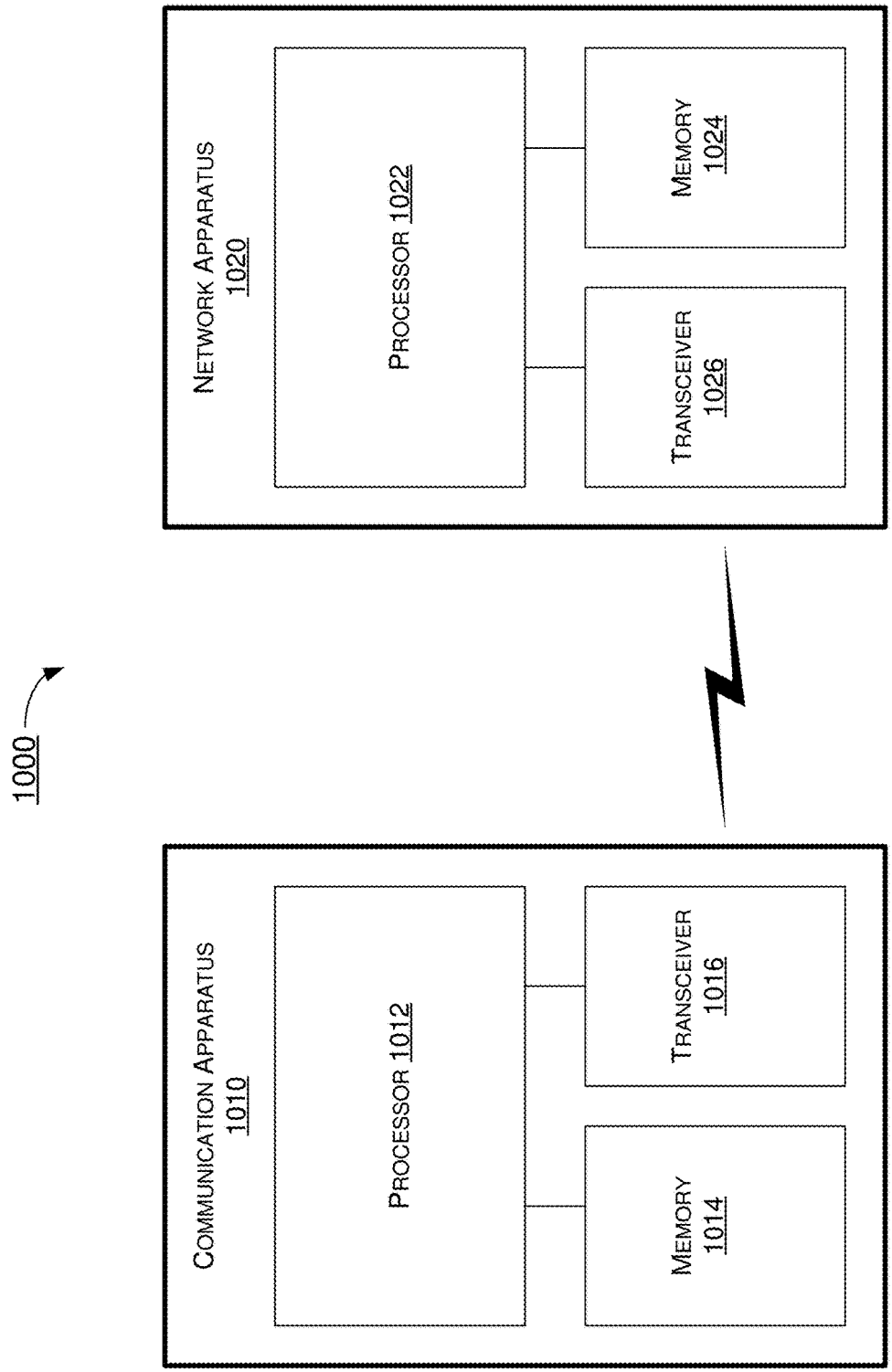
FIG. 10 is a block diagram of an example communication apparatus and an example network apparatus in accordance with an implementation of the present disclosure.

FIG. 10 illustrates an example communication apparatus 1010 and an example network apparatus 1020 in accordance with an implementation of the present disclosure. Each of communication apparatus 1010 and network apparatus 1020 may perform various functions to implement schemes, techniques, processes and methods described herein pertaining to S-NSSAI based congestion control enhancement with respect to user equipment and network apparatus in wireless communications, including schemes/scenarios described above as well as processes 1100, 1200, 1300 and 1400 described below.

Communication apparatus 1010 may be a part of an electronic apparatus, which may be a UE such as a portable or mobile apparatus, a wearable apparatus, a wireless communication apparatus or a computing apparatus. For instance, communication apparatus 1010 may be implemented in a smartphone, a smartwatch, a personal digital assistant, a digital camera, or a computing equipment such as a tablet computer, a laptop computer, a notebook computer or a vehicle. Communication apparatus 1010 may also be a part of a machine type apparatus, which may be an IoT, NB-IoT, or IIoT apparatus such as an immobile or a stationary apparatus, a home apparatus, a wire communication apparatus or a computing apparatus. Alternatively, communication apparatus 1010 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 1010 may include at least some of those components shown in FIG. 10 such as a processor 1012, for example. Processor 1012 may further comprise protocol stacks and a set of system modules and circuits which may be implemented and configured by software, firmware, hardware, and/or combination thereof. The function modules and circuits, when executed by the processors via program instructions contained in memory 1014, interwork with each other to allow communication apparatus 1010 to perform embodiments and functional tasks and features in the network. For example, system modules and circuits may comprise a PDU session handling circuit that performs PDU session establishment and modification procedures with network apparatus 1020, a policy control circuit that performs URSP rule matching, and a configuration and control circuit that handles configuration and control parameters for mobility management and session management. Communication apparatus 1010 may further include one or more other components not pertinent to the proposed scheme of the present disclosure (e.g., internal power supply, display device and/or user interface device), and, thus, such component(s) of communication apparatus 1010 are neither shown in FIG. 10 nor described below in the interest of simplicity and brevity.

Network apparatus 1020 may be a part of an electronic apparatus, which may be a network node such as a base station, a small cell, a router or a gateway. For instance, network apparatus 1020 may be implemented in an eNodeB in an LTE, LTE-Advanced or LTE-Advanced Pro network or in a gNB in a 5G, NR, IoT, NB-IoT, IIoT or V2X network. Alternatively, network apparatus 1020 may be implemented in the form of one or more IC chips such as, for example and without limitation, one or more single-core processors, one or more multi-core processors, or one or more RISC or CISC processors. Network apparatus 1020 may include at least some of those components shown in FIG. 10 such as a processor 1022, for example. Processor 1022 may further include protocol stacks and a set of control functional modules and circuit. For example, a PDU session handling circuit may handle PDU session establishment and modification procedures. A policy control circuit may configure policy rules for communication apparatus 1010. A configuration and control circuit may provide different parameters to configure and control communication apparatus 1010 of related functionalities including mobility management and session management. Network apparatus 1020 may further include one or more other components not pertinent to the proposed scheme of the present disclosure (e.g., internal power supply, display device and/or user interface device), and, thus, such component(s) of network apparatus 1020 are neither shown in FIG. 10 nor described below in the interest of simplicity and brevity.

In one aspect, each of processor 1012 and processor 1022 may be implemented in the form of one or more single-core processors, one or more multi-core processors, or one or more CISC processors. That is, even though a singular term "a processor" is used herein to refer to processor 1012 and processor 1022, each of processor 1012 and processor 1022 may include multiple processors in some implementations and a single processor in other implementations in accordance with the present disclosure. In another aspect, each of processor 1012 and processor 1022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1012 and processor 1022 is a special-purpose machine specifically designed, arranged and configured to perform specific tasks in a device (e.g., as represented by communication apparatus 1010) and a network (e.g., as represented by network apparatus 1020) in accordance with various implementations of the present disclosure.

In some implementations, communication apparatus 1010 may also include a transceiver 1016 coupled to processor 1012 and capable of wirelessly transmitting and receiving data. In some implementations, communication apparatus 1010 may further include a memory 1014 coupled to processor 1012 and capable of being accessed by processor 1012 and storing data therein. In some implementations, network apparatus 1020 may also include a transceiver 1026 coupled to processor 1022 and capable of wirelessly transmitting and receiving data. In some implementations, network apparatus 1020 may further include a memory 1024 coupled to processor 1022 and capable of being accessed by processor 1022 and storing data therein. Accordingly, communication apparatus 1010 and network apparatus 1020 may wirelessly communicate with each other via transceiver 1016 and transceiver 1026, respectively. To aid better understanding, the following description of the operations, functionalities and capabilities of each of communication apparatus 1010 and network apparatus 1020 is provided in the context of a mobile communication environment in which communication apparatus 1010 is implemented in or as a communication apparatus or a UE and network apparatus 1020 is implemented in or as a network node of a communication network.

In some implementations, processor 1012 may be configured to transmit, via transceiver 1016, a request message to network apparatus 1020. The request message may comprise at least one of a PDU session establishment request, a PDU session modification request, and a PDU session release request. In an event that network apparatus 1020 is in the congestion status, processor 1012 may receive, via transceiver 1016, a message with a congestion cause and a back-off timer for congestion control from network apparatus 1020. The message may comprise at least one of a PDU session establishment reject, a PDU session modification reject, and a PDU session release command. After receiving the message, processor 1012 may be configured to start a back-off timer. Processor 1012 may associate the back-off timer with an S-NSSAI in an event that the S-NSSAI is provided by network apparatus 1020. The S-NSSAI is the updated/latest S-NSSAI of the current PDU session provided by network apparatus 1020. The back-off timer started by processor 1012 may comprise at least one of a congestion back-off timer T3584 and a congestion back-off timer T3585.

In some implementations, processor 1012 may register in a first PLMN (e.g., VPLMN 1). Processor 1012 may be configured to transmit, via transceiver 1016, a PDU session establishment request message to VPLMN 1. Processor 1012 may provide no S-NSSAI to VPLMN 1 (e.g., processor 1012 does not provide any S-NSSAI value). Then, VPLMN 1 may transmit a PDU session establishment accept message to processor 1012. VPLMN 1 may select and provide an S-NSSAI value (e.g., S-NSSAI_1) to processor 1012. Thus, the PDU session may be established between communication apparatus 1010 and VPLMN 1 with S-NSSAI_1. Processor 1012 may transfer from the first PLMN to a second PLMN (e.g., inter-PLMN change from VPLMN 1 to VPLMN 2). The S-NSSAI of the PDU session may be changed from S-NSSAI_1 to S-NSSAI_2. At this moment, the PDU session may be maintained between communication apparatus 1010 and VPLMN 2 with S-NSSAI_2. When in the VPLMN 2, processor 1012 may be configured to perform a PDU session modification/release procedure with VPLMN 2. VPLMN 2 may transmit a message with a congestion cause. After receiving the congestion cause, processor 1012 may be configured to start a back-off timer. The back-off timer may comprise the congestion back-off timer T3584 or the congestion back-off timer T3585. Processor 1012 may associate the back-off timer with the updated/latest S-NSSAI (e.g., S-NSSAI_2).

In some implementations, processor 1012 may be configured to transmit, via transceiver 1016, a request message to network apparatus 1020. The request message may comprise at least one of a PDU session establishment request, a PDU session modification request, and a PDU session release request. In an event that network apparatus 1020 is in the congestion status, processor 1012 may receive a message with a congestion cause and a back-off timer for congestion control from the network node. The message may comprise at least one of a PDU session establishment reject, a PDU session modification reject, and a PDU session release command. After receiving the message, processor 1012 may be configured to start the back-off timer. Processor 1012 may associate the back-off timer with a mapped HPLMN S-NSSAI in an event that the back-off timer is applied in all PLMN. Processor 1012 may determine whether the back-off timer is applied in all PLMN according to an ABO parameter/indicator.

In some implementations, processor 1012 may be configured to transmit, via transceiver 1016, a PDU session establishment request message to network apparatus 1020. Processor 1012 may provide a valid S-NSSAI value (e.g., S-NSSAI_1) to network apparatus 1020. In an event that one the network node (e.g., SMF) is in the congestion status, processor 1022 may transmit, via transceiver 1026, a PDU session establishment reject message with a congestion cause to communication apparatus 1010. Processor 1022 may further provide the ABO parameter/indicator to indicate that the back-off timer is applied in all PLMNs. After receiving the congestion cause and "ABO=applied in all PLMNs", processor 1012 may be configured to start a back-off timer. The back-off timer may comprise the congestion back-off timer T3584 or the congestion back-off timer T3585. Processor 1012 may associate the back-off timer with the mapped HPLMN S-NSSAI part of S-NSSAI_1.

In some implementations, processor 1012 may receive, via transceiver 1016, a message with a back-off timer from network apparatus 1020. Processor 1012 may be configured to start the back-off timer associated with an S-NSSAI of a PDU session. Then, processor 1012 may determine whether an S-NSSAI of a request message is the S-NSSAI associated with the back-off timer. In an event that the S-NSSAI of the request message is the S-NSSAI associated with the back-off timer, processor 1012 may forbid a transmission of the request message (e.g., processor 1012 is not allowed to transmit the request message). The request message may comprise at least one of a PDU session establishment request and a PDU session modification request.

In some implementations, processor 1012 may receive, via transceiver 1016, a message with a back-off timer from the network node. Processor 1012 may be configured to start the back-off timer associated with an S-NSSAI of a PDU session. When the back-off timer is running, processor 1012 may further receive a 5GSM message from network apparatus 1020. Then, processor 1012 may determine whether an S-NSSAI of PDU session of the 5GSM message is the S-NSSAI associated with the back-off timer. In an event that the S-NSSAI of PDU session of the 5GSM message is the S-NSSAI associated with the back-off timer, processor 1012 may be configured to stop the back-off timer. The 5GSM message may comprise at least one of a PDU session modification command and a PDU session release command without a back-off timer value information element.

Illustrative Processes

Figure 11:
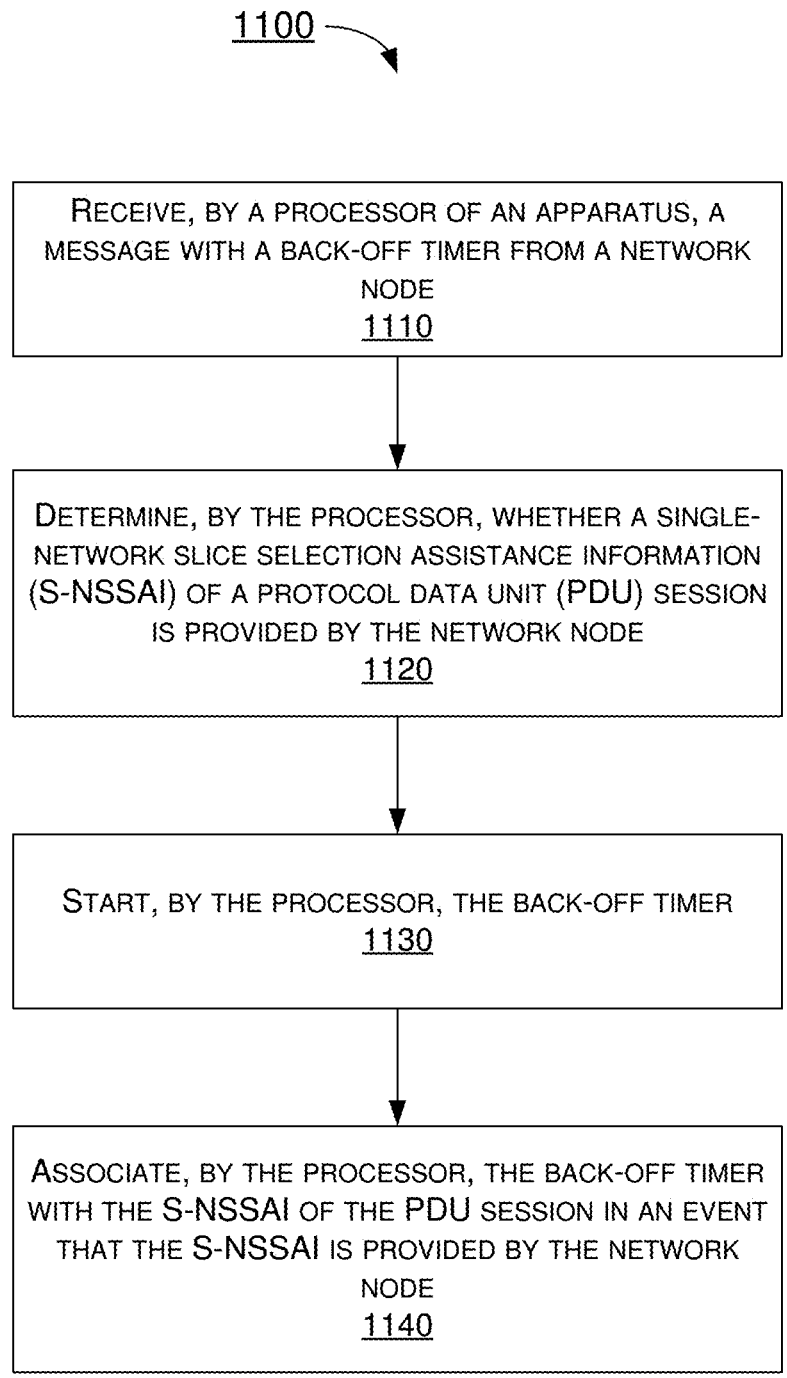
FIG. 11 is a flowchart of an example process in accordance with an implementation of the present disclosure.

FIG. 11 illustrates an example process 1100 in accordance with an implementation of the present disclosure. Process 1100 may be an example implementation of above scenarios/schemes, whether partially or completely, with respect to applying the updated/latest S-NSSAI of the PDU session to the back-off timer for the S-NSSAI based congestion control with the present disclosure. Process 1100 may represent an aspect of implementation of features of communication apparatus 1010. Process 1100 may include one or more operations, actions, or functions as illustrated by one or more of blocks 1110, 1120, 1130 and 1140. Although illustrated as discrete blocks, various blocks of process 1100 may be divided into additional blocks, combined into fewer blocks, or eliminated, depending on the desired implementation. Moreover, the blocks of process 1100 may executed in the order shown in FIG. 11 or, alternatively, in a different order. Process 1100 may be implemented by communication apparatus 1010, any suitable UE or machine type devices. Solely for illustrative purposes and without limitation, process 1100 is described below in the context of n communication apparatus 1010. Process 1100 may begin at block 1110.

At 1110, process 1100 may involve processor 1012 of apparatus 1010 receiving a message with a back-off timer from a network node. Process 1100 may proceed from 1110 to 1120.

At 1120, process 1100 may involve processor 1012 determining whether an S-NSSAI of a PDU session is provided by the network node. Process 1100 may proceed from 1120 to 1130.

At 1130, process 1100 may involve processor 1012 starting the back-off timer. Process 1100 may proceed from 1130 to 1140.

At 1140, process 1100 may involve processor 1012 associating the back-off timer with the S-NSSAI of the PDU session in an event that the S-NSSAI is provided by the network node.

In some implementations, process 1100 may involve processor 1012 transmitting a request message to the network node. The request message may comprise at least one of a PDU session establishment request, a PDU session modification request, and a PDU session release request.

In some implementations, the message may comprise at least one of a PDU session establishment reject, a PDU session modification reject, and a PDU session release command.

In some implementations, the S-NSSAI may be a current or latest S-NSSAI of the PDU session.

In some implementations, process 1100 may involve processor 1012 transmitting a PDU session establishment request message with a valid S-NSSAI or no S-NSSAI to the network node.

In some implementations, process 1100 may involve processor 1012 transferring from a first public land mobile network (PLMN) to a second PLMN. Process 1100 may further involve processor 1012 receiving the S-NSSAI associated with the second PLMN from the network node.

In some implementations, the message may comprises a 5GSM cause value #67 which represents insufficient resources for a specific slice and DNN or a 5GSM cause value #69 which represents insufficient resources for a specific slice.

In some implementations, the back-off timer may comprise at least one of a congestion back-off timer T3584 and a congestion back-off timer T3585.

Figure 12:
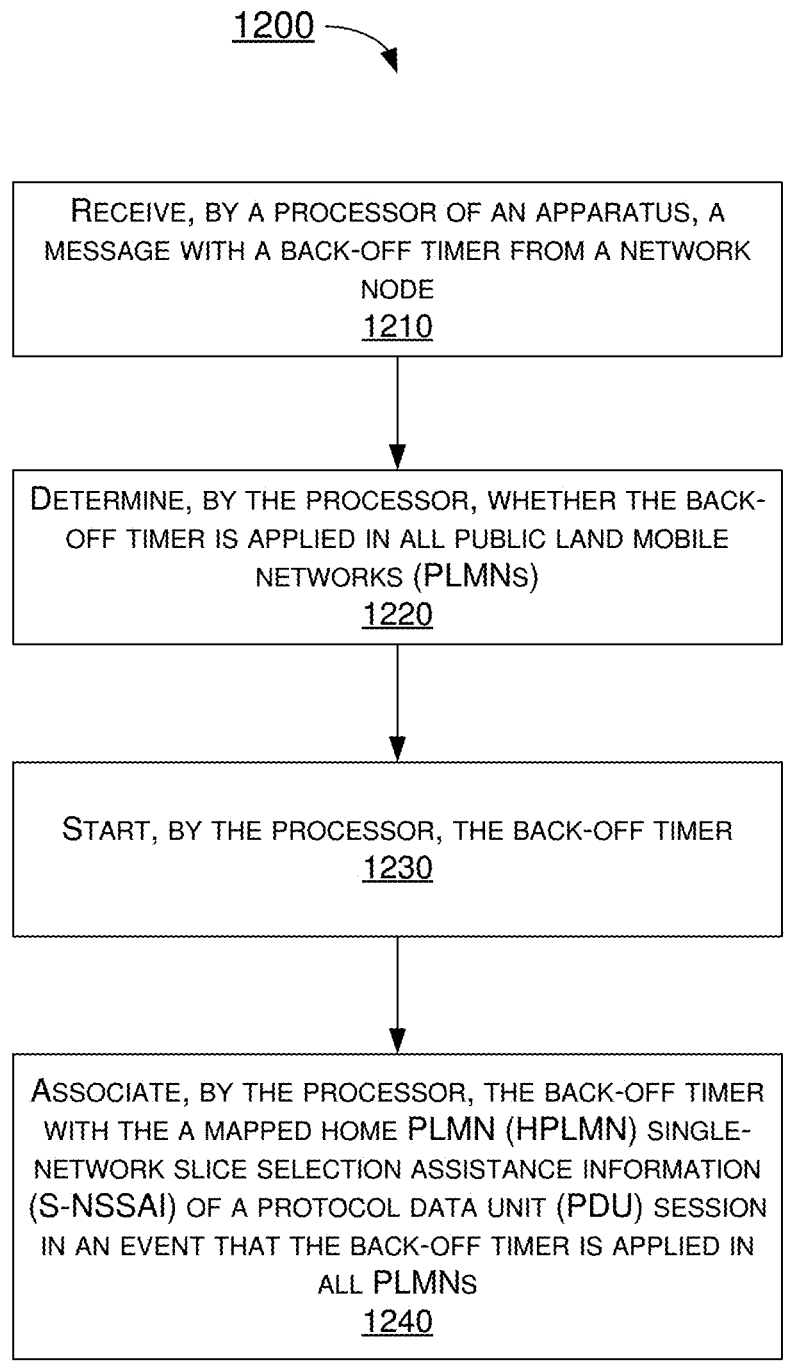
FIG. 12 is a flowchart of an example process in accordance with an implementation of the present disclosure.

FIG. 12 illustrates an example process 1200 in accordance with an implementation of the present disclosure. Process 1200 may be an example implementation of above scenarios/schemes, whether partially or completely, with respect to how to associate the S-NSSAI value with the back-off timer in an event that the back-off timer is applied in all PLMNs with the present disclosure. Process 1200 may represent an aspect of implementation of features of communication apparatus 1010. Process 1200 may include one or more operations, actions, or functions as illustrated by one or more of blocks 1210, 1220, 1230 and 1240. Although illustrated as discrete blocks, various blocks of process 1200 may be divided into additional blocks, combined into fewer blocks, or eliminated, depending on the desired implementation. Moreover, the blocks of process 1200 may executed in the order shown in FIG. 12 or, alternatively, in a different order. Process 1200 may be implemented by communication apparatus 1010, any suitable UE or machine type devices. Solely for illustrative purposes and without limitation, process 1200 is described below in the context of n communication apparatus 1010. Process 1200 may begin at block 1210.

At 1210, process 1200 may involve processor 1012 of apparatus 1010 receiving a message with a back-off timer from a network node. Process 1200 may proceed from 1210 to 1220.

At 1220, process 1200 may involve processor 1012 determining whether the back-off timer is applied in all PLMNs. Process 1200 may proceed from 1220 to 1230.

At 1230, process 1200 may involve processor 1012 starting the back-off timer. Process 1200 may proceed from 1230 to 1240.

At 1240, process 1200 may involve processor 1012 associating the back-off timer with a mapped HPLMN S-NSSAI of a PDU session in an event that the back-off timer is applied in all PLMNs.

In some implementations, process 1200 may involve processor 1012 transmitting a request message to the network node. The request message may comprise at least one of a PDU session establishment request, a PDU session modification request, and a PDU session release request.

In some implementations, the message may comprise at least one of a PDU session establishment reject, a PDU session modification reject, and a PDU session release command.

In some implementations, process 1200 may involve processor 1012 determining whether the back-off timer is applied in all PLMNs according to an ABO parameter.

In some implementations, process 1200 may involve processor 1012 transmitting a PDU session establishment request message with a valid S-NSSAI to the network node.

In some implementations, process 1200 may involve processor 1012 transmitting a PDU session establishment request message with no S-NSSAI to the network node.

In some implementations, process 1200 may involve processor 1012 registering in a VPLMN. The back-off timer may be not associated with a serving PLMN S-NSSAI but associated with the mapped HPLMN S-NSSAI.

In some implementations, the message may comprise a 5GSM cause value #67 which represents insufficient resources for a specific slice and DNN or a 5GSM cause value #69 which represents insufficient resources for a specific slice.

In some implementations, process 1200 may involve processor 1012 registering in an HPLMN. Process 1200 may also involve processor 1012 determining whether the mapped HPLMN S-NSSAI is received from the network node. Process 1200 may further involve processor 1012 associating the back-off timer with the mapped HPLMN S-NSSAI in an event that the mapped HPLMN S-NSSAI is received from the network node.

In some implementations, the back-off timer may comprise at least one of a congestion back-off timer T3584 and a congestion back-off timer T3585.

Figure 13:
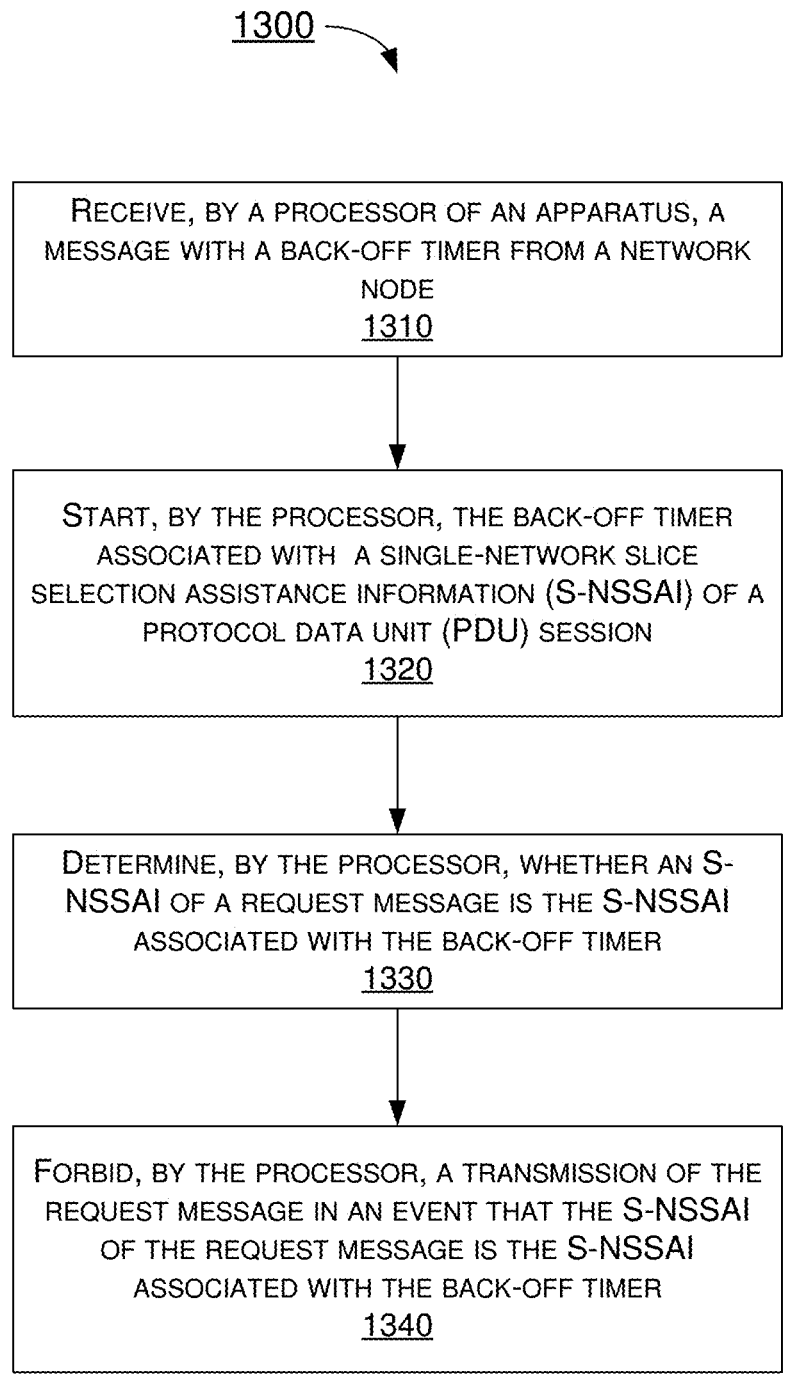
FIG. 13 is a flowchart of an example process in accordance with an implementation of the present disclosure.

FIG. 13 illustrates an example process 1300 in accordance with an implementation of the present disclosure. Process 1300 may be an example implementation of above scenarios/schemes, whether partially or completely, with respect to which procedures should be applied with the back-off timer when the back-off timer is running and applied in all PLMNs with the present disclosure. Process 1300 may represent an aspect of implementation of features of communication apparatus 1010. Process 1300 may include one or more operations, actions, or functions as illustrated by one or more of blocks 1310, 1320, 1330 and 1340. Although illustrated as discrete blocks, various blocks of process 1300 may be divided into additional blocks, combined into fewer blocks, or eliminated, depending on the desired implementation. Moreover, the blocks of process 1300 may executed in the order shown in FIG. 13 or, alternatively, in a different order. Process 1300 may be implemented by communication apparatus 1010, any suitable UE or machine type devices. Solely for illustrative purposes and without limitation, process 1300 is described below in the context of n communication apparatus 1010. Process 1300 may begin at block 1310.

At 1310, process 1300 may involve processor 1012 of apparatus 1010 receiving a message with a back-off timer from a network node. Process 1300 may proceed from 1310 to 1320.

At 1320, process 1300 may involve processor 1012 starting the back-off timer associated with an S-NSSAI of a PDU session. Process 1300 may proceed from 1320 to 1330.

At 1330, process 1300 may involve processor 1012 determining whether an S-NSSAI of a request message is the S-NSSAI associated with the back-off timer. Process 1300 may proceed from 1330 to 1340.

At 1340, process 1300 may involve processor 1012 forbidding a transmission of the request message in an event that the S-NSSAI of the request message is the S-NSSAI associated with the back-off timer.

In some implementations, the request message may comprise at least one of a PDU session establishment request and a PDU session modification request.

In some implementations, the S-NSSAI of the request may be the S-NSSAI associated with the PDU session establishment request message, or the S-NSSAI of the PDU session associated with the PDU session modification request message.

In some implementations, the S-NSSAI of the request may the mapped HPLMN S-NSSAI associated with the PDU session establishment request message, or the mapped HPLMN S-NSSAI of the PDU session associated with the PDU session modification request message.

In some implementations, when the back-off timer is applied in all PLMNs, the S-NSSAI of the request message may comprise a mapped HPLMN S-NSSAI of the PDU session or a mapped HPLMN S-NSSAI of the PDU session establishment request. The S-NSSAI associated with the back-off timer may comprise a mapped HPLMN S-NSSAI.

In some implementations, when the back-off timer is applied in all PLMNs, the S-NSSAI of the request message may comprise an HPLMN S-NSSAI or serving PLMN S-NSSAI of the PDU session or an HPLMN S-NSSAI or serving PLMN S-NSSAI of the PDU session establishment request. The S-NSSAI associated with the back-off timer may comprise a mapped HPLMN S-NSSAI.

In some implementations, when the back-off timer is applied in an RPLMN, the S-NSSAI of the request message may comprise an S-NSSAI of the PDU session or an S-NSSAI of the PDU session establishment request.

Figure 14:
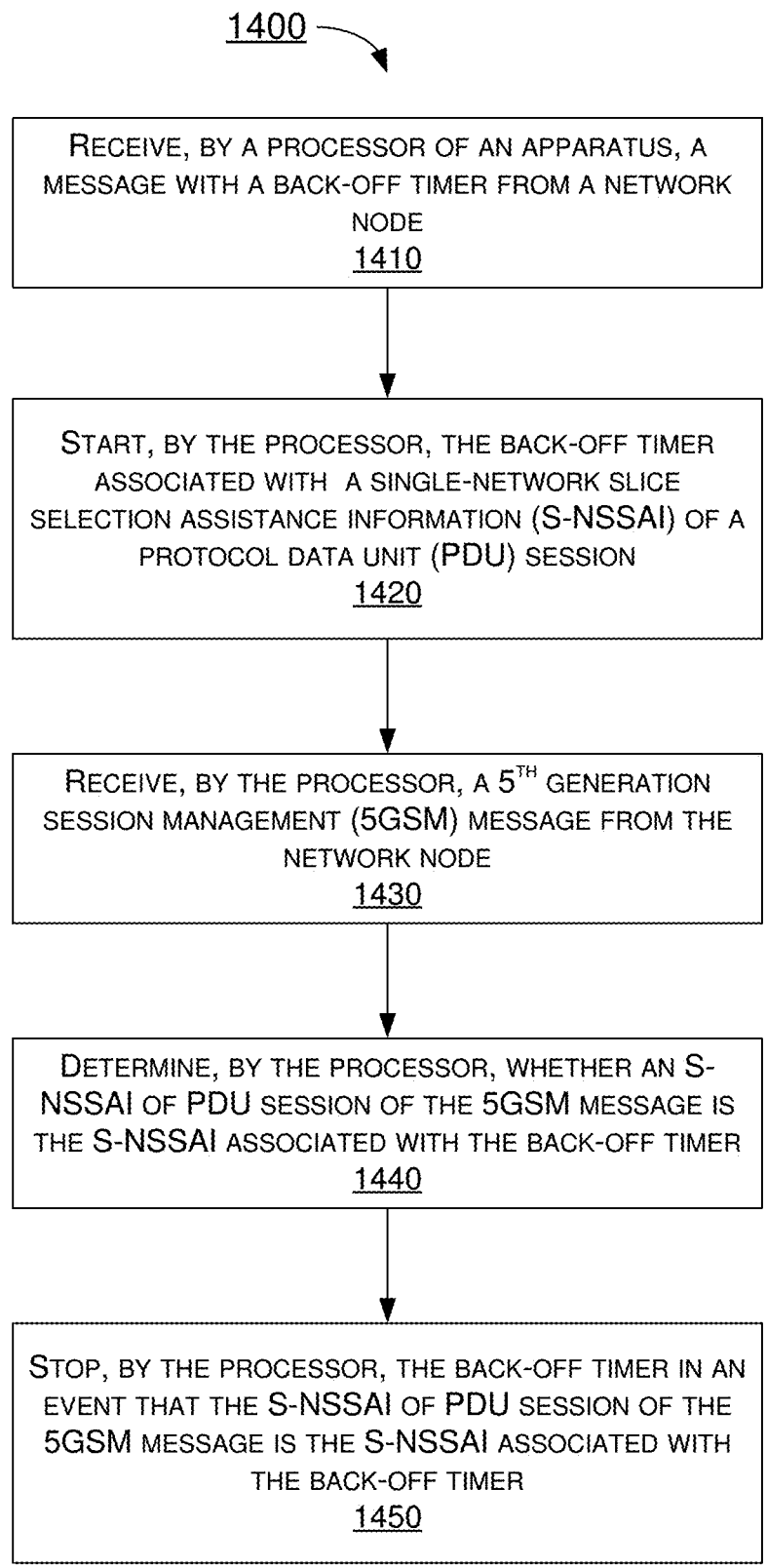
FIG. 14 is a flowchart of an example process in accordance with an implementation of the present disclosure.

FIG. 14 illustrates an example process 1400 in accordance with an implementation of the present disclosure. Process 1400 may be an example implementation of above scenarios/schemes, whether partially or completely, with respect to how to stop the back-off timer when the back-off timer is running with the present disclosure. Process 1400 may represent an aspect of implementation of features of communication apparatus 1010. Process 1400 may include one or more operations, actions, or functions as illustrated by one or more of blocks 1410, 1420, 1430, 1440 and 1450. Although illustrated as discrete blocks, various blocks of process 1400 may be divided into additional blocks, combined into fewer blocks, or eliminated, depending on the desired implementation. Moreover, the blocks of process 1400 may executed in the order shown in FIG. 14 or, alternatively, in a different order. Process 1400 may be implemented by communication apparatus 1010, any suitable UE or machine type devices. Solely for illustrative purposes and without limitation, process 1400 is described below in the context of n communication apparatus 1010. Process 1400 may begin at block 1410.

At 1410, process 1400 may involve processor 1012 of apparatus 1010 receiving a message with a back-off timer from a network node. Process 1400 may proceed from 1410 to 1420.

At 1420, process 1400 may involve processor 1012 starting the back-off timer associated with an S-NSSAI of a PDU session. Process 1400 may proceed from 1420 to 1430.

At 1430, process 1400 may involve processor 1012 receiving a 5GSM message from the network node. Process 1400 may proceed from 1430 to 1440.

At 1440, process 1400 may involve processor 1012 determining whether an S-NSSAI of PDU session of the 5GSM message is the S-NSSAI associated with the back-off timer. Process 1400 may proceed from 1440 to 1440.

At 1450, process 1400 may involve processor 1012 stopping the back-off timer in an event that the S-NSSAI of PDU session of the 5GSM message is the S-NSSAI associated with the back-off timer.

In some implementations, the 5GSM message may comprise at least one of a PDU session modification command and a PDU session release command without a back-off timer value information element.

In some implementations, when the back-off timer is applied in all PLMNs, the S-NSSAI of PDU session of the 5GSM message may comprise a mapped HPLMN S-NSSAI of PDU session of the 5GSM message. The S-NSSAI associated with the back-off timer may comprise a mapped HPLMN S-NSSAI.

In some implementations, when the back-off timer is applied in all PLMNs, the S-NSSAI of PDU session of the 5GSM message may comprise a mapped HPLMN S-NSSAI or serving PLMN S-NSSAI of PDU session of the 5GSM message. The S-NSSAI associated with the back-off timer may comprise a mapped HPLMN S-NSSAI.

In some implementations, when the back-off timer is applied in an RPLMN, the S-NSSAI of PDU session of the 5GSM message may comprise a serving PLMN S-NSSAI of PDU session of the 5GSM message.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, a $5^{th}$ generation session management (5GSM) message with a back-off timer from a network node of a wireless network;
   starting, by the processor, the back-off timer;
   associating, by the processor, the back-off timer with a mapped home public land mobile network (HPLMN) single-network slice selection assistance information (S-NSSAI) part of a valid S-NSSAI value provided by the apparatus to the wireless network; and
   in an event that the apparatus is in a roaming scenario:
   determining, by the processor, whether a mapped HPLMN S-NSSAI of a protocol data unit (PDU) session of the 5GSM message is same as the mapped HPLMN S-NSSAI part of the valid S-NSSAI value associated with the back-off timer; and
   stopping, by the processor, the back-off timer responsive to a positive result from the determining; in an event that the apparatus is in a non-roaming scenario:
   determining, by the processor, whether a mapped HPLMN S-NSSAI or serving PLMN S-NSSAI of the PDU session of the 5GSM message is same as the mapped HPLMN S-NSSAI part of the valid S-NSSAI value associated with the back-off timer; and
   stopping, by the processor, the back-off timer responsive to a positive result from the determining.

2. The method of claim 1, wherein the S-NSSAI is a current or latest S-NSSAI of the PDU session.

3. The method of claim 1, further comprising:
   transmitting, by the processor, a PDU session establishment request message with a valid S-NSSAI or no S-NSSAI to the network node.

4. The method of claim 1, further comprising:
   transferring, by the processor, from a first public land mobile network (PLMN) to a second PLMN; and
   receiving, by the processor, the S-NSSAI associated with the second PLMN from the network node.

5. The method of claim 1, wherein the 5GSM message comprises a 5GSM cause value #67 which represents insufficient resources for a specific slice and data network name (DNN) or a 5GSM cause value #69 which represents insufficient resources for a specific slice.

6. The method of claim 1, wherein the back-off timer comprises at least one of a congestion back-off timer T3584 and a congestion back-off timer T3585.

7. A method, comprising:
   receiving, by a processor of an apparatus, a 5th generation session management (5GSM) message with a back-off timer from a network node of a wireless network;
   starting, by the processor, the back-off timer associated with a mapped home public land mobile network (HPLMN) single-network slice selection assistance information (S-NSSAI) part of a valid S-NSSAI value provided by the apparatus to the wireless network;
   determining, by the processor, whether an S-NSSAI of a request message is the S-NSSAI associated with the back-off timer;
   forbidding, by the processor, a transmission of the request message in an event that the S-NSSAI of the request message is the S-NSSAI associated with the back-off timer;
   in an event that the apparatus is in a roaming scenario:
   determining, by the processor, whether a mapped HPLMN S-NSSAI of a protocol data unit (PDU) session of the 5GSM message is same as the mapped HPLMN S-NSSAI part of the valid S-NSSAI value associated with the back-off timer; and stopping, by the processor, the back-off timer responsive to a positive result from the determining;
   in an event that the apparatus is in a non-roaming scenario:
   determining, by the processor, whether the mapped HPLMN S-NSSAI or a serving PLMN S-NSSAI of the PDU session of the 5GSM message is same as the mapped HPLMN S-NSSAI part of the valid S-NSSAI value associated with the back-off timer; and stopping, by the processor, the back-off timer responsive to a positive result from the determining.

8. The method of claim 7, wherein the S-NSSAI of the request is a mapped HPLMN S-NSSAI associated with a PDU session establishment request message, or the mapped HPLMN S-NSSAI of the PDU session associated a PDU session modification request message.

9. The method of claim 7, wherein when the back-off timer is applied in all PLMNs, the S-NSSAI of the request message comprises a mapped HPLMN S-NSSAI of the PDU session or a mapped HPLMN S-NSSAI of a PDU session establishment request, and wherein the S-NSSAI associated with the back-off timer comprises the mapped HPLMN S-NSSAI.

10. The method of claim 7, wherein when the back-off timer is applied in all PLMNs, the S-NSSAI of the request message comprises a mapped HPLMN S-NSSAI of the PDU session or a mapped HPLMN S-NSSAI of a PDU session establishment request, and wherein the S-NSSAI associated with the back-off timer comprises the mapped HPLMN S-NSSAI.

11. The method of claim 7, wherein when the back-off timer is applied in a registered public land mobile networks (RPLMN), the S-NSSAI of the request message comprises an S-NSSAI of the PDU session or an S-NSSAI of a PDU session establishment request.

12. An apparatus, comprising:
a transceiver which, during operation, wirelessly communicates with a network node of a wireless network; and
a processor communicatively coupled to the transceiver such that, during operation, the processor performs operations comprising:
receiving, via the transceiver, a message with a back-off timer from the network node;
starting the back-off timer;
associating the back-off timer with a mapped home public land mobile network (HPLMN) S-NSSAI part of a valid S-NSSAI value provided by the apparatus to the wireless network; and
in an event that the apparatus is in a roaming scenario:
determining whether a mapped HPLMN S-NSSAI of a protocol data unit (PDU) session of the 5GSM message is same as the mapped HPLMN S-NSSAI part of the valid S-NSSAI value associated with the back-off timer; and stopping the back-off timer responsive to a positive result from the determining;
in an event that the apparatus is in a non-roaming scenario:
determining whether a mapped HPLMN S-NSSAI or serving PLMN S-NSSAI of the PDU session of the 5GSM message is same as the mapped HPLMN S-NSSAI part of the valid S-NSSAI value associated with the back-off timer; and stopping the back-off timer responsive to a positive result from the determining.

13. An apparatus, comprising:
a transceiver which, during operation, wirelessly communicates with a network node of a wireless network; and
a processor communicatively coupled to the transceiver such that, during operation, the processor performs operations comprising:
receiving, via the transceiver, a message with a back-off timer from the network node;
starting the back-off timer associated with a mapped home public land mobile network (HPLMN) single-network slice selection assistance information (S-NSSAI) part of a valid S-NSSAI value provided by the apparatus to the wireless network;
determining whether an S-NSSAI of a request message is the S-NSSAI associated with the back-off timer;
forbidding a transmission of the request message in an event that the S-NSSAI of the request message is the S-NSSAI associated with the back-off timer;
in an event that the apparatus is in a roaming scenario:
determining whether a mapped HPLMN S-NSSAI of a protocol data unit (PDU) session of the 5GSM message is same as the mapped HPLMN S-NSSAI part of the valid S-NSSAI value associated with the back-off timer; and stopping the back-off timer responsive to a positive result from the determining;
in an event that the apparatus is in a non-roaming scenario:
determining whether the mapped HPLMN S-NSSAI or a serving PLMN S-NSSAI of the PDU session of the 5GSM message is same as the mapped HPLMN S-NSSAI part of the valid S-NSSAI value associated with the back-off timer; and stopping the back-off timer responsive to a positive result from the determining.

\* \* \* \* \*